United States Patent
Kitajima et al.

(10) Patent No.: US 7,125,137 B2
(45) Date of Patent: Oct. 24, 2006

(54) LIGHT-EMITTING UNIT

(75) Inventors: Shigemasa Kitajima, Oogaki (JP); Shinobu Takahashi, Gifu (JP); Kyosuke Ito, Anpachigun (JP)

(73) Assignees: B-Sure Co. USA, Los Angeles, USA; Kitajima Seisakusho Co., Ltd., Gifu (JP)

( * ) Notice: Subject to any disclaimer, the term of this patent is extended or adjusted under 35 U.S.C. 154(b) by 17 days.

(21) Appl. No.: 10/856,532

(22) Filed: May 28, 2004

(65) Prior Publication Data

US 2004/0240230 A1 Dec. 2, 2004

(51) Int. Cl.
*F21S 8/00* (2006.01)

(52) U.S. Cl. ............ 362/153; 362/555; 362/231; 362/612; 362/800; 315/294; 315/312

(58) Field of Classification Search ............ 362/153, 362/219, 231, 605, 612, 613, 233, 301, 555, 362/800; 315/294, 312, 316; 52/1–140
See application file for complete search history.

(56) References Cited

U.S. PATENT DOCUMENTS

| | | | |
|---|---|---|---|
| 5,779,339 A * | 7/1998 | Konishi et al. ............ 362/606 |
| 6,016,038 A * | 1/2000 | Mueller et al. ............ 315/291 |
| 6,608,453 B1 * | 8/2003 | Morgan et al. ............ 315/312 |
| 6,857,230 B1 * | 2/2005 | Owen ........................ 52/126.6 |
| 2003/0012035 A1 * | 1/2003 | Bernard ...................... 362/555 |

* cited by examiner

*Primary Examiner*—Renee Luebke
*Assistant Examiner*—Zahra I. Bennett
(74) *Attorney, Agent, or Firm*—Muramatsu & Associates

(57) ABSTRACT

A surface light-emitting unit installed on a floor or wall of a structure is able to emit light from its surface for unique illumination effects. A surface light-emitting unit includes a transparent glass plate that can transmit light; a light-conducting plate installed below the glass plate; a light-emitting means having multiple light-emitting diodes of different colors and installed on the side face of the light-conducting plate; a light-diffusing/reflecting member installed below the light-conducting plate that diffuses and reflects the light; an emission-color selection means for selecting the light-emitting diode to be illuminated or blinked; a casing for providing the transparent glass plate at the top opening; a casing for installing above components; and a connection part that can be connected to other surface light-emitting unit installed adjacently.

13 Claims, 15 Drawing Sheets

LIGHT-EMITTING UNIT

LIGHT-EMITTING UNIT

This application claims foreign filing priority upon Japanese patent application Ser. No. 2003-154048 filed on May 30, 2003. The contents of which are all herein incorporated by reference in their entireties.

FIELD OF THE INVENTION

This invention relates to a surface light-emitting unit, specifically a surface light-emitting unit installed along a floor or wall of a structure and is able to emit light from its surface.

BACKGROUND OF THE INVENTION

Flush-type light-emitting devices that are embedded in a floor of a store, restaurant, etc., and emit light from its surface (top surface) are known. This type of light-emitting device is able to produce artistic and decorative effects using light and give visual entertainment to the customers, etc.

However, the above light-emitting device is buried in a floor of a building and therefore generally installed during the construction of the building. Considerable work is required if the device is to be installed in an existing floor. Therefore, the conventional light-emitting devices could not promptly satisfy the needs for producing artistic or decorative effects using light only during an event held in a store or specific program presented in an exhibition venue, and the prohibitive construction expenses required to install this type of light-emitting device also made the device unsuitable for such applications.

To easily achieve floor lighting, lighting devices that can be installed on an existing floor have been proposed. This type of device has a box-shaped casing with an open top, a plate-shaped reinforced plastic material installed in the top opening of the casing, a plate-shaped light-diffusing member installed below the reinforced plastic material, and a fluorescent tube or other light source for irradiating the light-diffusing member. A commercial AC power supply is used as a power source for irradiating the light source. By arranging multiple light-emitting units in vertical and horizontal rows, a large lighting system can be configured.

To supply operating power to the light sources of multiple light-emitting units and also control the light sources individually, lighting systems equipped with a dimming console that outputs DMX signal and a dimming panel that has dedicated transformers for supplying power and data to the multiple light-emitting units are known. The dimming panel has a power cable for connecting to the commercial AC power supply (such as 100 VAC), an input terminal for connecting to the dimming console and inputting DMX signal, and multiple output terminals for outputting direct-current power (such as 24 VDC) and data in accordance with the control by DMX signal, and by connecting a light-emitting unit to each output terminal the panel can control multiple light-emitting units via DMX signal.

However, the above lighting device requires a relatively tall casing and the top face of the lighting device, or the actual floor of the building, is relatively high, because the reinforced plastic material, light-diffusing member and light source must be stacked on top of one another in the casing. This not only limits the location for installing a lighting device in terms of the height of the ceiling or entrance/exit, but it also creates a large height gap between the sections where a lighting device is installed and not installed, thereby posing a concern over stepping up/down the device by people walking on top.

In addition, since the above lighting device utilizes a fluorescent tube as its light source, the color emitted from the surface material becomes a monotone color. As a result, it is not possible to emit a desired color or change the color with the passage of time. Consequently, this lighting device could not fully produce a full-scale light fantasy or illusion, either, to arouse excitement in the customers.

When the casing of the above lighting device has a rectangular solid shape, multiple lighting devices can be arranged in vertical and horizontal rows. In other words, by combining multiple lighting devices in accordance with the floor area of the installation location a large lighting system can be configured. However, since each lighting device has a power cable extending from it that supplies power to the light source, combining multiple lighting devices requires each power cable to be connected to mains power (outlet). This made the wiring of power cables more complex, reduces the aesthetic effects, and sometimes made it difficult to interconnect the lighting devices.

In addition, the reinforced plastic material installed in the top opening of the casing scratches easily due to contact with the edge of a heal or umbrella worn/held by people walking on top, and the scratched areas tend to become clouded. For this reason, there arise concerns that transparency would be lost with the passing of time, thereby making the illumination look darker despite the brightness of the light source remaining the same. There are also concerns that clouding would reduce the esthetic look. Surface clouding can be suppressed by using reinforced glass in place of reinforced plastic material, but glass is generally slippery and might cause people walking on top to trip.

In the conventional technology, in a lighting system configured by arranging multiple light-emitting units in vertical and horizontal rows, each light-emitting unit is connected directly to an output terminal on the dimming panel in order to transmit operating power and data from the dimming panel to each light-emitting unit. Therefore, the dimming panel has to include as many cables (power lines) as the number of light-emitting units, and these cables have the length required for connecting the light-emitting unit installed farthest from the dimming panel. This made it easy for the multiple cables to get tangled with one another and often resulted in a complex wiring layout. Particularly since the number and locations of light-emitting units vary depending on the size and shape of the floor on which they are installed, there are also cases where the cables are unnecessarily long or too short to connect the respective light-emitting units. Further, the complex cabling sometimes reduces the aesthetic effects and made it difficult to interconnect the light-emitting units.

In addition, the enclosure of the dimming panel used in the above lighting system is large because it has many transformers. This made it difficult to install the dimming panel near the installing system, and in many cases the panel has to be installed away from the light-emitting units or in an exposed condition. If the panel has to be installed away from the light-emitting units, an extension cable or other means is required, which added to the complexity of wiring. Further, installing the panel in an exposed condition often makes the appearance unattractive and consequently the artistic effect by light. Since the number of light-emitting units connectable to one dimming panel is not infinite but generally limited to around 20 units, multiple dimming panels are required when configuring a lighting system combining more light-emitting units and this limits the installation location.

SUMMARY OF THE INVENTION

In light of the above conditions, the present invention aims to provide a light-emitting unit that can be installed very easily and allows for transmission of power and data without limiting the installation location, etc., even when a lighting system is configured using many light-emitting units, and is also able to fully produce light fantasy and other lighting effects.

The surface light-emitting unit in the first aspect of the invention comprises a plate-shaped surface member that can transmit light; a light-conducting plate installed below the surface member; a light-emitting means having multiple light-emitting diodes of different emission colors and installed on the side face of the light-conducting plate; a light-diffusing/reflecting member installed below the light-conducting plate that diffuses and reflects the light transmitting through the light-conducting plate; an emission-color selection means for selecting the light-emitting diode to be illuminated or blinked among those provided by the light-emitting means; a roughly rectangular solid casing for providing the surface member at the top opening, wherein the casing stores the light-conducting plate, light-emitting means and light-diffusing/reflecting member and is installed along a mounting surface such as a floor or wall of a structure; and a connection part that can be connected to other surface light-emitting unit installed adjacently.

Here, examples of "surface member" include reinforced plastic and reinforced glass. Examples of "light-conducting plate" include an acrylic resin plate. Examples of "light-diffusing/reflecting member" include a white plate. White fluorescent bodies may be dispersed between the light-diffusing/reflecting member and the light-conducting plate.

As a result, the surface light-emitting unit in the first aspect of the invention has its light-emitting means having light-emitting diodes located on the side face of the conducting plate, and therefore the light emitted by the light-emitting diodes travels through the light-conducting plate and irradiates the light-diffusing/reflecting member located below (on the reverse side of) the light-conducting plate. The irradiated light is then diffused by the light-diffusing/reflecting member and a part of the diffused light is emitted from the top face (surface) of the light-conducting plate. This light is then emitted externally via the surface member provided at the top opening of the casing. In other words, the light-conducting plate functions as a surface light source and illuminates the roughly entire area of the surface member.

In particular, the light-emitting means has multiple light-emitting diodes of different emission colors, so selecting the light-emitting diode to be illuminated or blinked using the emission-color selection means will allow the light emitted from the selected light-emitting diode to be emitted externally. When three types of light-emitting diodes each emitting red (R), green (G) and blue (B) are provided, for example, a desired color can be emitted from the surface member by properly combining the light-emitting diodes to be illuminated. The color of emitted light can also be changed by switching the light-emitting diodes to be illuminated.

In addition, by connecting the connection part of one surface light-emitting unit with that of other surface light-emitting unit, multiple surface light-emitting units can be combined on a flat surface. Particularly since the number of surface light-emitting units that can be combined is not limited, it is possible, for example, to combine multiple units to an appropriate size matching the space of the installation floor surface.

In a case where white fluorescent bodies are dispersed between the light-diffusing/reflecting member and the light-conducting plate, the light emitted by the light-emitting diodes travels through the light-conducting plate and irradiates the white fluorescent bodies located below the light-conducting plate. The white fluorescent bodies then emit fluorescent light in color corresponding to the wavelength of the light received from the light-emitting diodes. In other words, the areas where white fluorescent bodies are located emit fluorescent light in response to the stimulation of a specific wavelength. This increases the brightness of the light-conducting plate. The light transmitting through areas where there are no white fluorescent bodies, or the light transmitting through the white fluorescent bodies, irradiates the light-diffusing/reflecting member located below the light-conducting plate.

The surface light-emitting unit in another aspect of the invention, further comprising a spacer between the casing and mounting surface that creates a space; and a power terminal installed on the outer bottom face of the casing that can connect a power cable for supplying operating power to the light-emitting means and a power-distribution cable for distributing the supplied operating power to other surface light-emitting unit installed adjacently; wherein the space is set sufficiently wide for wiring at least the power cable and power-distribution cable.

Therefore, in the surface light-emitting unit, connecting one end of the power cable to the power terminal of a surface light-emitting unit and the other end to a mains power outlet or the power terminal of other surface light-emitting unit to which operating power is supplied will allow for supply of operating power to the subject surface light-emitting unit and enable the light-emitting means to illuminate. In addition, connecting one end of the power-distribution cable to the power terminal of a surface light-emitting unit and the other end to the power terminal of other surface light-emitting unit to which operating power is not supplied will allow for supply of operating power to the other surface light-emitting unit. In other words, since multiple surface light-emitting units can be connected in series via each power-distribution cable, even when installing multiple surface light-emitting units simply connecting one surface light-emitting unit to a mains power outlet will allow operating power to be supplied sequentially to other multiple surface light-emitting units.

A space is created between the casing and mounting surface by the spacer, while the power terminal is located on the outer bottom face of the casing. Therefore, even when multiple surface light-emitting units are connected their power cables and power-distribution cable can be wired through this space.

The surface light-emitting unit in a further aspect of the invention, comprising a cylindrical liquid-blocking member formed around the power terminal on the outer bottom face of the casing and used to block liquid, flowing along the outer bottom surface of the casing, from flowing down toward the power terminal.

If water, beverage or other liquid drips onto the top face of the surface light-emitting unit installed along a floor of a building, for example, the liquid may travel on the side face of the casing and reach its outer bottom face. On a unit where a power terminal is provided on the outer bottom face of the casing, safety against leak current could be undermined by liquid flowing down along the outer bottom face toward the power terminal.

However, the surface light-emitting unit of the present invention has a cylindrical liquid-blocking member formed around the power terminal and therefore if liquid flows to the outer bottom face of the casing, the liquid will flow down along the exterior face of the liquid-blocking member and will not flow toward the power terminal.

The surface light-emitting unit in a further aspect of the invention, wherein the emission-color selection means has a microcomputer that sends and receives light-emission information to and from other surface light-emitting unit, and wherein such microcomputer has a judgment means for judging the master-slave relationship with respect to other surface light-emitting unit and a light-emission control means that transmits the light-emission information to other surface light-emitting unit when the judgment means has judged that the own unit is the master, or receives the light-emission information sent from other surface light-emitting unit when the judgment means has judged that the own unit is the slave, and then illuminates or blinks the light-emitting diodes based on the light-emission information. The transmission between microcomputers may be implemented via a signal line or wirelessly.

Therefore, the surface light-emitting unit allows for communication with other surface light-emitting unit connected to it and interlocks its illumination or blinking condition with that of such other unit. In other word, if the surface light-emitting unit is set as the master (parent unit), the microcomputer built into the surface light-emitting unit judges that the own unit is the master and sends light-emission information to other surface light-emitting unit. On the other hand, if the surface light-emitting unit is set as the slave (child unit), the microcomputer built into the surface light-emitting unit judges that the own unit is the slave and receives the light-emission information sent from the surface light-emitting unit set as the master, and then controls the illumination condition of the light-emitting means based on the light-emission information. In short, setting as the master (parent unit) any one of multiple surface light-emitting units that have been installed will allow for interlocking of the illumination conditions of all surface light-emitting units, thereby making it possible, for example, to illuminate all surface light-emitting units in a predefined pattern.

If each surface light-emitting unit comprises an address-setting switch that sets the unit's position (such as row or column) with respect to the whole, information regarding illumination position can be added to the illumination pattern. As a result, displaying a specific design pattern or lettering using multiple surface light-emitting units becomes possible.

The surface light-emitting unit in a further aspect of the invention, wherein the light-emitting means is formed by groups of light-emitting diodes each comprising three-color light-emitting diodes arranged in a triangular shape and the multiple light-emitting diode groups are arranged in a single line along the side face of the light-conducting plate.

If light-emitting diodes emitting red (R), green (G) and blue (B) lights are provided as the multiple light-emitting diodes forming the light-emitting means, light of a desired color can be emitted from the surface member by properly combining the illumination conditions of these light-emitting diodes. However, arranging the three-color light-emitting diodes along the side face of the light-conducting plate sequentially in a repeated pattern might make it difficult to illuminate the entire surface uniformly or might reduce the overall brightness. Since two diodes of different colors exist between a pair of adjacent diodes of a given color, when emitting a primary color (red, etc.), for example, the interval of adjacent illuminating light-emitting diodes will become three times the diameter of a light-emitting diode or more. In other words, the light-emitting area becomes one-third of the side face of the light-conducting plate or less, thereby posing concerns for reduced uniformity and overall brightness of illumination.

On the other hand, the surface light-emitting unit in the further aspect of the invention noted above is formed by groups of light-emitting diodes, each comprising light-emitting diodes of three colors (R, G and B) arranged in a triangular shape, and therefore the unit's length is shorter than when three-color light-emitting diodes are arranged side by side in a single line. As a result, when multiple light-emitting diodes are to be arranged along the side face of the light-conducting plate, the interval of each repeated pair of adjacent light-emitting diodes of a given color will decrease and the number of light-emitting diodes that can be installed per given length will increase. Therefore, the light emitted from the surface member will become roughly uniform and the overall brightness will increase.

The surface light-emitting unit in a further aspect of the invention, wherein the light-emitting means is formed by light-emitting diode arrays where the light-emitting diodes of three colors are arranged sequentially in a repeated pattern along the side face of the light-conducting plate in such a way that the adjacent light-emitting diodes have different colors, and wherein the multiple light-emitting diode arrays are stacked in the thickness direction of the light-conducting plate, and the light-emitting diode arrays are displaced in the vertical direction with respect to the stacking direction in such a way that the light-emitting diodes in the stacking direction do not overlap with one another and the light-emitting diodes in each diagonally facing pair have different colors.

Therefore, the surface light-emitting unit has multiple arrays (such as two rows) of light-emitting diodes stacked in the thickness direction of the light-conducting plate in such a way that the light-emitting diodes do not overlap with one another and the light-emitting diodes in each diagonally facing pair have different colors. This places the three-color light-emitting diodes uniformly with respect to the side face of the light-conducting plate and thereby shortens the interval between an adjacent pair of light-emitting diodes of a given color. As a result, the light emitted from the surface member will become more uniform and the brightness will increase significantly.

The surface light-emitting unit in a further aspect of the invention, wherein the surface member is formed by a transparent glass plate with multiple projections formed on its surface at specified intervals.

Therefore, the surface light-emitting unit has its surface member formed by a transparent glass plate and is thus more resistant to scratching and suppresses clouding of the surface. In addition, since its surface has multiple projections formed at specified intervals, these projections serve to provide appropriate resistance and prevent people walking on top from slipping when the unit is installed on a floor of a structure, for example. (The word "appropriate" is used because excessive resistance might cause stumbling and tripping and must therefore be prevented.) Comprising the transparent glass plate using laminated glass will prevent pieces of glass from scattering around in case the glass breaks.

The light-emitting unit given by the second invention comprises a light-emitting means having multiple light-emitting diodes; a power terminal that can connect a power cable for supplying commercial AC power and a power-transmission cable for transmitting the supplied commercial AC power to other light-emitting unit installed adjacently; a signal terminal that can connect a reception cable for receiving DMX signal from a dimming console and a transmission cable for transmitting the received DMX signal to other light-emitting unit installed adjacently; an AC/DC converter for converting the commercial AC power supplied via the power cable into the operating power for the light-emitting means; a light-emission control means for controlling the power supply to the multiple light-emitting diodes, based on the DMX signal received via the reception cable; and a casing for storing the light-emitting means, AC/DC converter and light-emission control means.

Here, "DMX signal" refers to a high-speed digital signal called "DMX 512 signal," and conforms to the dimming signal standard. The DMX 512 signal has 512 channels and allows for serial transmission of a maximum of 512 sets of data.

Therefore, in the light-emitting unit given by the second invention, connecting one end of the power cable to the power terminal of a light-emitting unit and the other end to a commercial AC power outlet or the power terminal of other light-emitting unit to which commercial AC power is supplied will allow for supply of commercial AC power to the subject light-emitting unit and enable the light-emitting diodes of the light-emitting means to illuminate. In addition, connecting one end of the power-transmission cable to the power terminal of a light-emitting unit and the other end to the power terminal of other light-emitting unit to which commercial AC power is not supplied will allow for supply of commercial AC power to the other light-emitting unit. In other words, since multiple light-emitting units can be connected via each power-transmission cable, even when configuring a lighting system that combines multiple light-emitting units simply connecting one light-emitting unit to a commercial AC power outlet will allow the commercial AC power to be supplied sequentially to other multiple light-emitting units. The commercial AC power (such as 100 VAC) supplied by the power cable is converted into direct-current operating power via the AC/DC converter installed in each light-emitting unit. Since the present invention uses light-emitting diodes of lower power consumption as its light source, each light-emitting unit can be illuminated reliably even in a multi-unit configuration.

Incidentally, connecting one end of the reception cable to the signal terminal of a light-emitting unit and the other end to the signal terminal of other light-emitting unit connected to the dimming console or otherwise receiving DMX signal will send DMX signal to the subject light-emitting unit. In addition, connecting one end of the transmission cable to the signal terminal of a light-emitting unit and the other end to the signal terminal of other light-emitting unit not receiving DMX signal will allow for transmission of DMX signal to the other light-emitting unit. In other words, since multiple light-emitting units can be connected in series via each transmission cable, even when configuring a lighting system that combines multiple light-emitting units simply connecting one light-emitting unit to the dimming console will allow DMX signal to be transmitted sequentially to other multiple light-emitting units. The light-emission control means provided in the light-emitting unit controls the power supply to the multiple light-emitting diodes based on the DMX signal received via the reception cable. As a result, the light-emitting diodes can be illuminated or blinked in accordance with the program, etc., stored in the dimming console.

The light-emitting unit given by the third invention comprises a plate-shaped surface member that can transmit light; a light-conducting plate installed below the surface member; a light-emitting means having multiple light-emitting diodes of different emission colors and installed on the side face of the light-conducting plate; a light-diffusing/reflecting member installed below the light-conducting plate that diffuses and reflects the light transmitting through the light-conducting plate; a power terminal that can connect a power cable for supplying commercial AC power and a power-transmission cable for transmitting the supplied commercial AC power to other light-emitting unit installed adjacently; a signal terminal that can connect a reception cable for receiving DMX signal from a dimming console and a transmission cable for transmitting the received DMX signal to other light-emitting unit installed adjacently; an AC/DC converter for converting the commercial AC power supplied via the power cable into the operating power for the light-emitting means; an emission-color selection means for selecting the light-emitting diode to be illuminated or blinked among those provided by the light-emitting means, based on the DMX signal received via the reception cable; a roughly rectangular solid casing for providing the surface member at the top opening, wherein the casing stores the light-conducting plate, light-emitting means, light-diffusing/reflecting member, AC/DC converter and emission-color selection means and is installed along a mounting surface such as a floor or wall of a structure; and a connection part that can be connected to other light-emitting unit installed adjacently.

Here, examples of "surface member" include reinforced plastic and reinforced glass. Examples of "light-conducting plate" include an acrylic resin plate. Examples of "light-diffusing/reflecting member" include a white plate. White fluorescent bodies may be dispersed between the light-diffusing/reflecting member and the light-conducting plate.

As a result, the light-emitting unit given by the third invention works in the same manner as the light-emitting unit given by the second invention. In addition, the light-emitting unit given by the third invention has its light-emitting means having light-emitting diodes located on the side face of the conducting plate, and therefore the light emitted by the light-emitting diodes travels through the light-conducting plate and irradiates the light-diffusing/reflecting member located below (on the reverse side of) the light-conducting plate. The irradiated light is then diffused by the light-diffusing/reflecting member and a part of the diffused light is emitted from the top face (surface) of the light-conducting plate. This light is then emitted externally via the surface member provided at the top opening of the casing. In other words, the light-conducting plate functions as a surface light source and illuminates the roughly entire area of the surface member.

In particular, the light-emitting means has multiple light-emitting diodes of different emission colors, so selecting the light-emitting diode to be illuminated or blinked using the emission-color selection means will allow the light emitted from the selected light-emitting diode to be emitted externally. When three types of light-emitting diodes each emitting red (R), green (G) and blue (B) are provided, for example, a desired color can be emitted from the surface member by properly combining the light-emitting diodes to be illuminated. The color of emitted light can also be changed by switching the light-emitting diodes to be illuminated.

White fluorescent bodies may also be dispersed between the light-diffusing/reflecting member and the light-conducting plate. In this case, the light emitted by the light-emitting diodes travels through the light-conducting plate and irradiates the white fluorescent bodies located below the light-conducting plate. The white fluorescent bodies then emit fluorescent light in color corresponding to the wavelength of the light received from the light-emitting diodes. In other words, the areas where white fluorescent bodies are located emit fluorescent light in response to the stimulation of a specific wavelength. This increases the brightness of the light-conducting plate. The light transmitting through areas where there are no white fluorescent bodies, or the light transmitting through the white fluorescent bodies, irradiates the light-diffusing/reflecting member located below the light-conducting plate.

The above light-emitting unit given by the third invention can also take a configuration in which it further comprises a spacer between the casing and mounting surface that creates a sufficient space for wiring the power cable, power-transmission cable, reception cable and transmission cable, and the power terminal and signal terminal are provided on the rear face of the casing opposing the mounting surface.

According to the light-emitting unit given by this invention, a space is created between the casing and mounting surface by the spacer, while the power terminal and signal terminal are located on the rear face of the casing. Therefore, even when multiple light-emitting units are connected their power cables, power-transmission cables, reception cables and transmission cables can be wired through this space. This prevents the power-transmission cables, etc., from being exposed and thus significantly enhances the appearance while improving the safety of people walking on top.

DETAILED DESCRIPTION OF THE INVENTION

Figure 1:
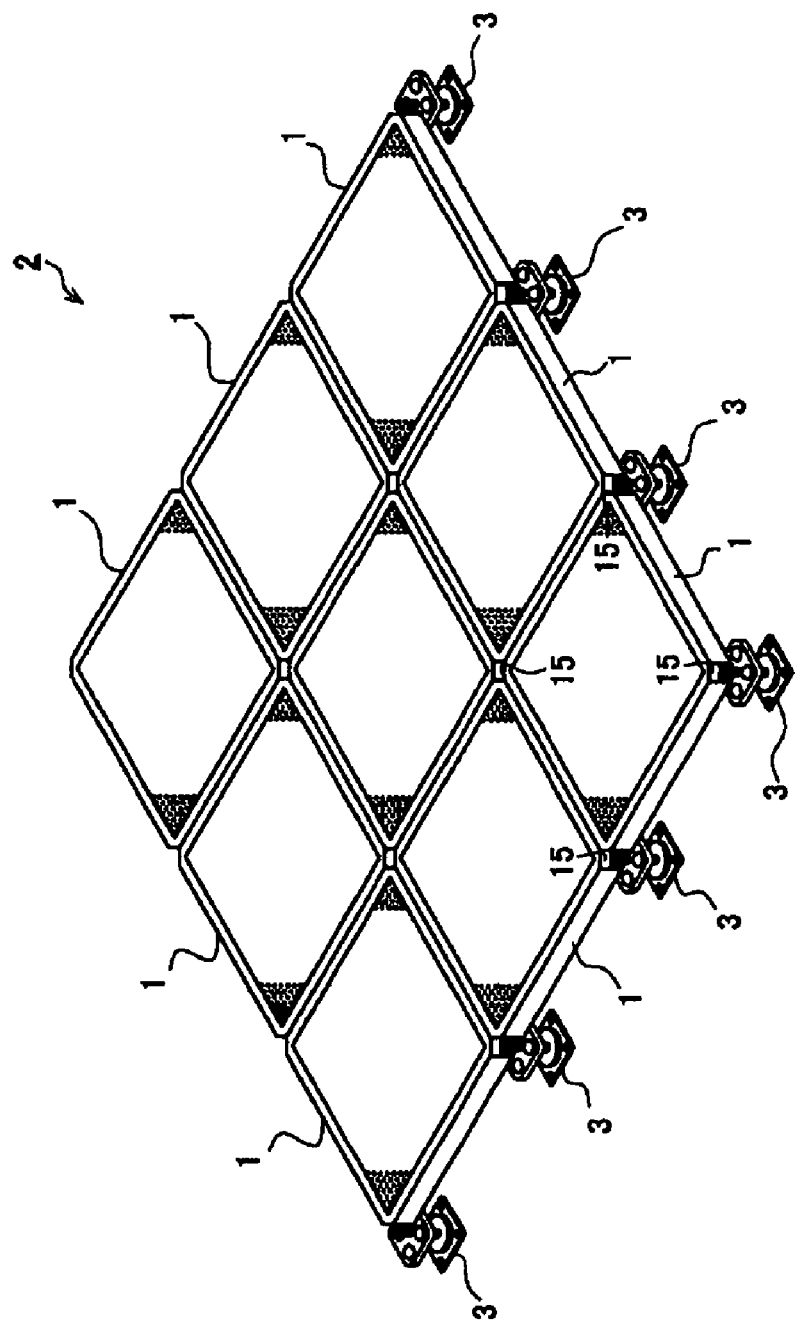
FIG. 1 is a perspective view illustrating a floor lighting system configured with the surface light-emitting unit given as an embodiment of the present invention.
Figure 2:
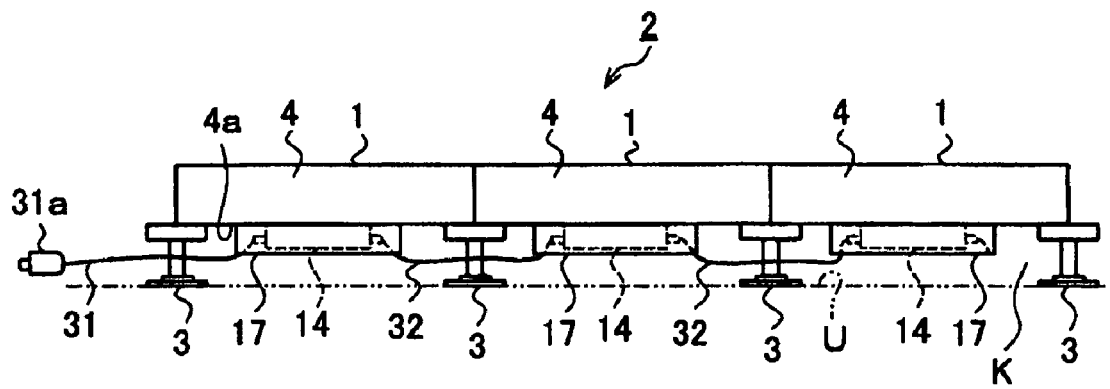
FIG. 2 is a side view illustrating the structure of the floor lighting system.
Figure 3:
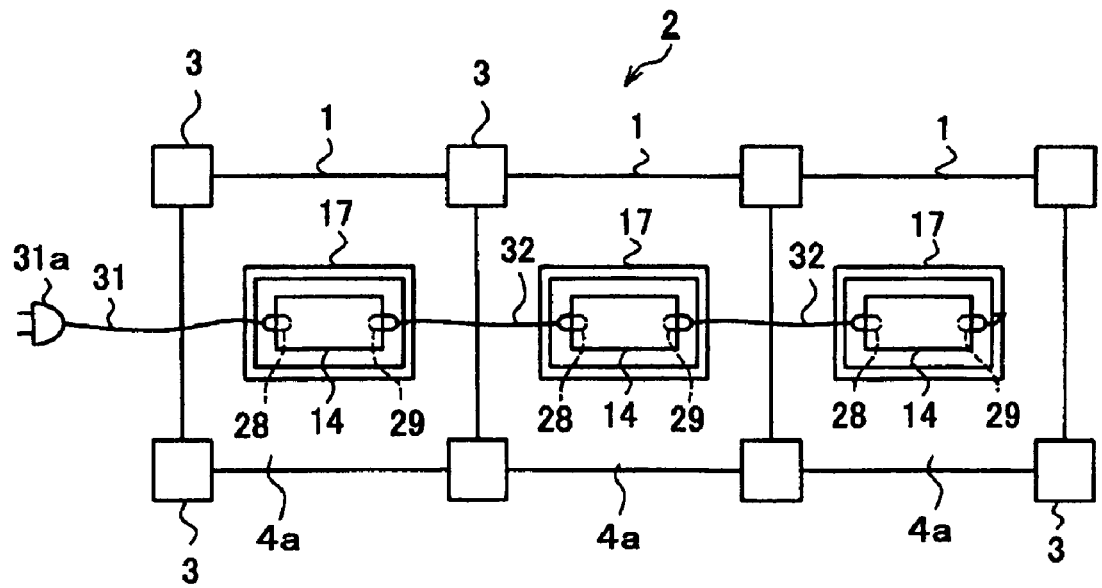
FIG. 3 is a bottom view illustrating the structure of the floor lighting system.
Figure 4:
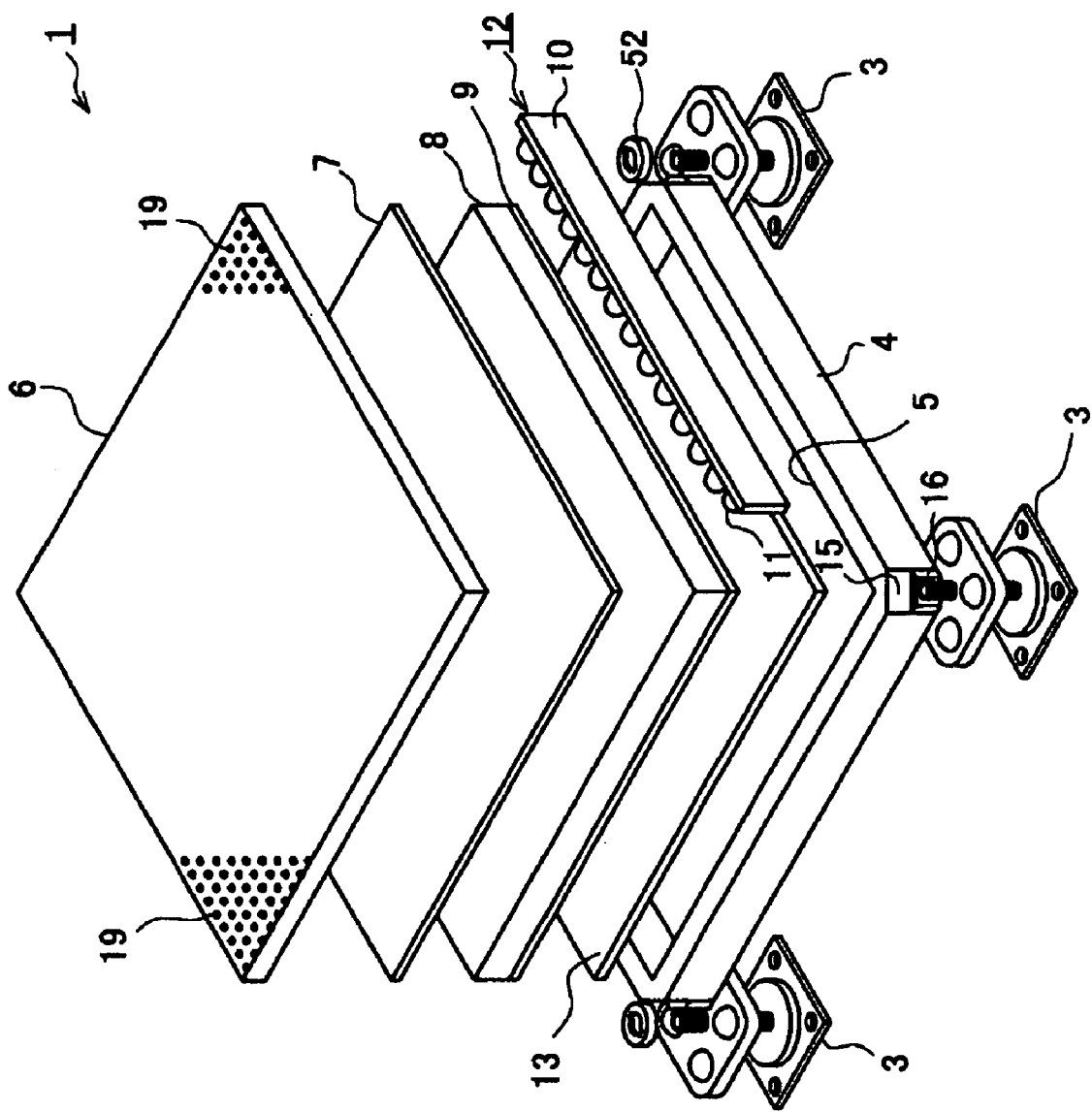
FIG. 4 is an exploded perspective view illustrating the structure of key parts of the surface light-emitting unit.
Figure 5:
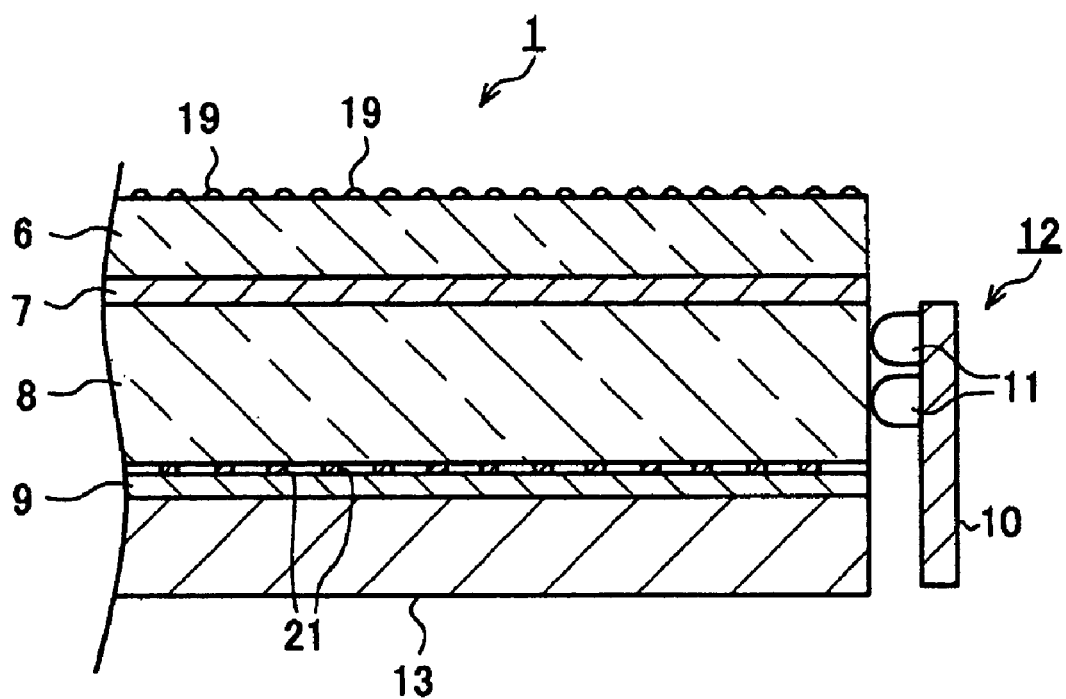
FIG. 5 is a section view illustrating the internal structure of the surface light-emitting unit.
Figure 6:
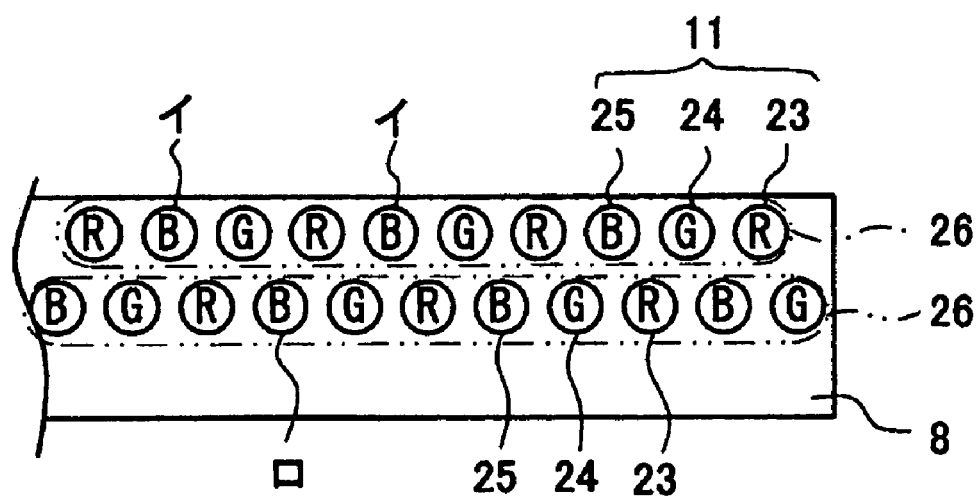
FIG. 6 is a schematic diagram illustrating the layout of light-emitting diodes in the surface light-emitting unit.
Figure 7:
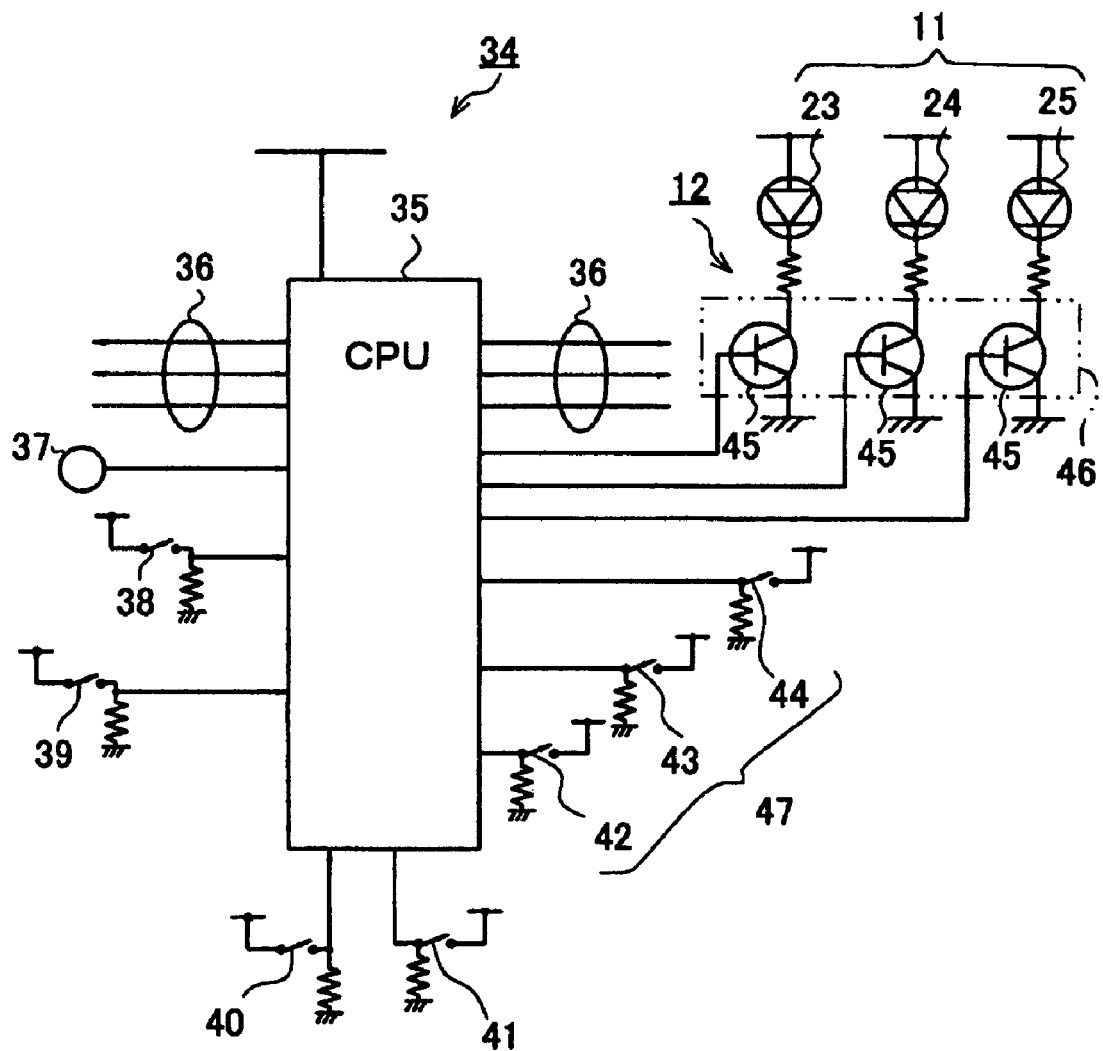
FIG. 7 is a circuit diagram illustrating the structure of the electrical circuit provided in the control unit of the surface light-emitting unit.
Figure 8:
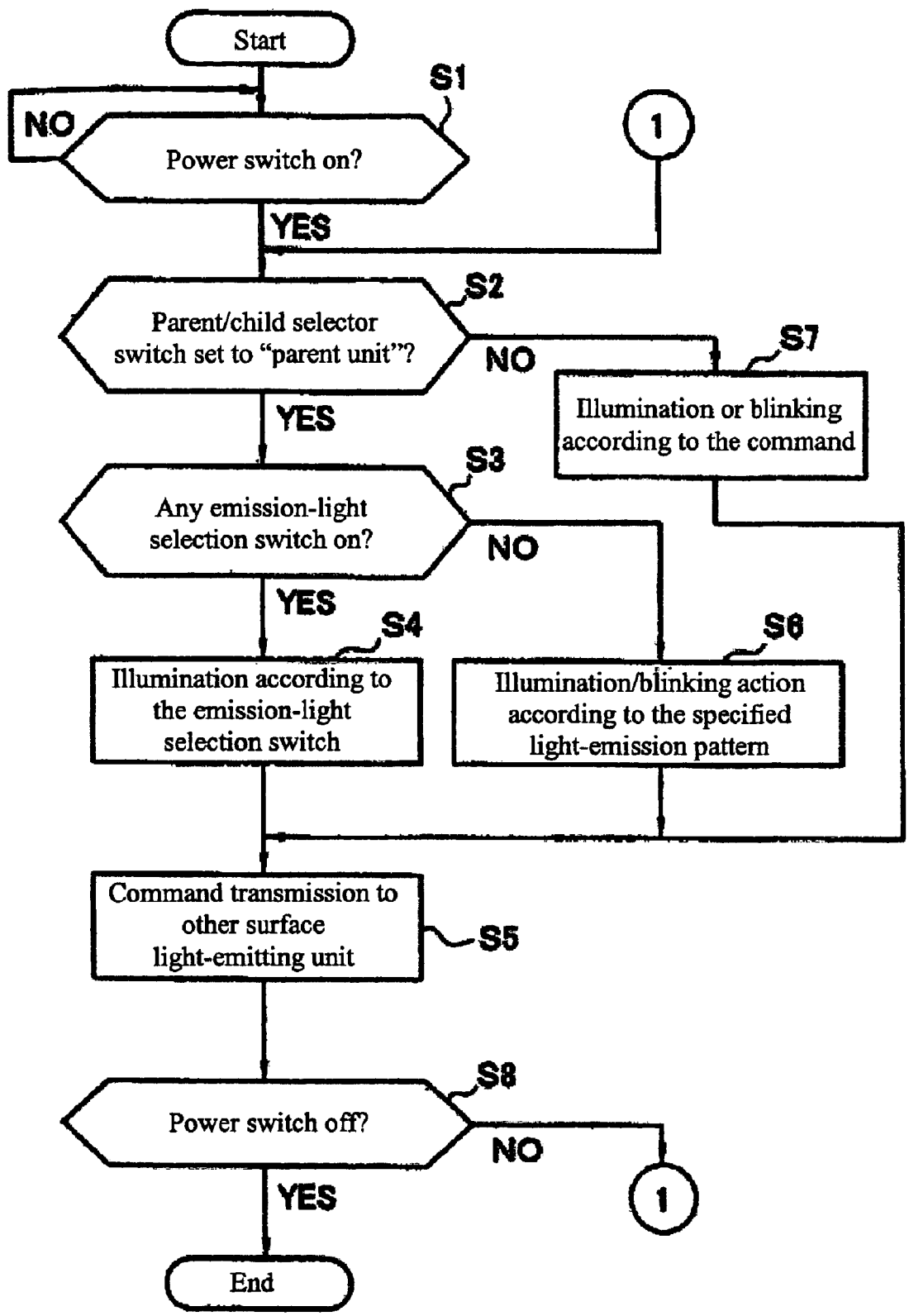
FIG. 8 is a flow chart illustrating the flow of processing in the control unit.
Figure 9:
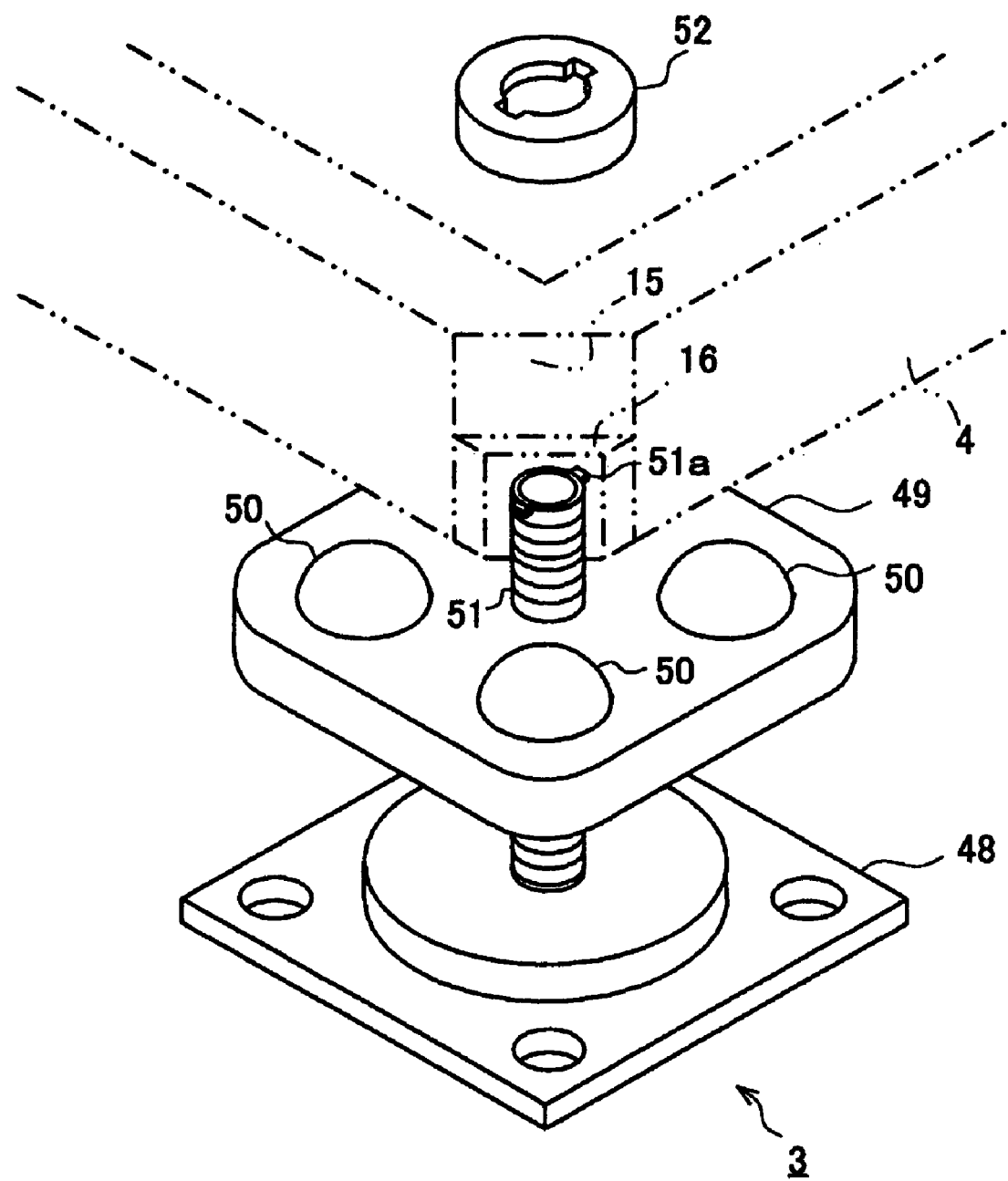
FIG. 9 is an enlarged perspective view illustrating the structure of the base metal used with the surface light-emitting unit.

An embodiment of the surface light-emitting unit 1 given by the present invention is explained according to FIGS. 1 through 9. FIGS. 1 through 3 provide a perspective view, side view and bottom view of a floor lighting system 2 combining multiple surface light-emitting units 1, while FIG. 4 gives an exploded perspective view of the surface light-emitting unit 1. FIG. 5 is a section view illustrating the structure of key parts of the surface light-emitting unit 1, FIG. 6 is an explanation drawing showing the arrangement of light-emitting diodes, FIG. 7 gives a circuit diagram for the control unit, and FIG. 8 provides a flow chart illustrating the flow of operations. FIG. 9 provides an enlarged perspective view illustrating the structure of the base metal.

The floor lighting system 2 given in this example combines multiple surface light-emitting units 1 on a flat surface, as shown in FIGS. 1 through 3, and is installed on a floor U of a structure, for example. FIG. 1 illustrates a system comprising nine surface light-emitting units 1, but the number of surface light-emitting units 1 that can be combined is not limited. Instead, the number can be set arbitrarily depending on the size and other properties of the installation floor (floor U). If the surface light-emitting unit 1 has a 500×500 mm square shape, a floor lighting system 2 of a rectangular or square shape whose side on plan view has a length corresponding to an integer multiple of 500 mm can be configured.

These surface light-emitting units 1 are connected via base metals 3. The specific structure of the base metal 3 is explained later. A base metal is installed in the four corners 15 of the surface light-emitting unit 1, in order to connect adjacent surface light-emitting units 1 and at the same time function as a spacer for defining a space K between the casing 4 of the surface light-emitting unit 1 and floor U. The height of the base metal 3 is adjustable in the vertical direction, preventing looseness of the surface light-emitting unit 1 and ensuring its stable installation.

As shown in FIGS. 4 and 5, the box-shaped casing 4 with an opening 5 in its top surface contains a light-emitting laminated structure that has, from top to bottom, a transparent glass plate 6, clear-resin diffusion plate 7, light-conducting plate 8 and light-diffusing/reflecting member 9, and a light-emitting means 12 comprising the multiple light-emitting diodes 11 installed on a board 10 is provided with respect to one side of the light-conducting plate 8. If necessary, the light-emitting means 12 can be provided with respect to each side (i.e., on four sides) of the light-conducting plate 8. A plate-shaped spacer 13 is provided between the inner bottom face of the casing 4 and the light-diffusing/reflecting member 9 in order to secure a space for storing the board 10 of the light-emitting means 12, and an electrical circuit box 14 (refer to FIGS. 2 and 3) is mounted on the outer bottom face of the casing 4.

The above structure is explained in detail. The casing 4 is a thin enclosure formed, for example, by metal plate material, and its planar shape is roughly square. As shown in FIGS. 1 and 4, the four corners 15 of the casing 4 have a triangular notch, which creates a quadrangular hole when four surface light-emitting units 1 are combined into a square shape. The shape of the notched four corners 15 is not symmetrical in the vertical direction of the casing 4, but the lower side of the notch projects further outward than the upper side. In other words, a projecting part 16 is created in the lower side of the four corners 15.

In addition, as shown in FIGS. 2 and 3, the outer bottom face 4a of the casing 4 has a cylindrical liquid-blocking member 17 hanging from it in a manner covering the area around the electrical circuit box 14, etc. Therefore, even when water, beverage or other liquid drips onto the top face of the surface light-emitting unit 2 and travels along the side face of the casing 4 to reach its outer bottom face, the liquid-blocking member 17 will prevent the liquid from flowing down toward the electrical circuit box 14.

As shown in FIGS. 4 and 5, the transparent glass plate 6 is formed by an achromatic, clear laminated glass or other material of approx. 8 mm in thickness, and multiple projections 19 made of blocks of fine glass particles are formed on its surface. These projections 19 generate appropriate resistance on the glass surface to prevent people walking on top from slipping. The size of the projection 19 is not specified, but setting its diameter to approx. 0.5 to 3 mm will effectively prevent slipping.

The following is a brief explanation of the production method of this transparent glass plate 6 having projections 19. First, adhesive for fine glass particles is applied on the glass plate surface in a specified pattern. Then, fine glass particles having a softening point lower than that of the glass plate are scattered on the glass plate surface to let them adhere to the adhesive for fine glass particles. Thereafter, fine glass particles not adhering to the adhesive for fine glass particles are removed by vacuuming or other means. Next, the glass plate with fine glass particles attached is thermally treated to fuse the fine glass particles onto the glass plate surface, after which the plate is cooled. Through this process, projections 19 are formed in a specified pattern on the glass plate surface.

The clear-resin diffusion plate 7 is a generally known plate-shaped member and diffuses the transmitting light to make it difficult to view the shape of the member located below, while emitting the light in a planar pattern.

The light-conducting plate 8 is a plate material formed by clear resin (such as an acrylic plate), and its surface size is roughly equivalent to that of the transparent glass plate 6. The thickness of the light-conducting plate 8 is not specified, but it should preferably be approx. 10 mm. As shown in FIG. 5, dot-shaped white fluorescent bodies 21 are arranged at specified intervals on the rear face of the light-conducting plate 8. These white fluorescent bodies 21 are formed by white fluorescent paint, for example, and emit fluorescent light in color corresponding to the wavelength of the light emitted by the light-emitting diodes 11. The size of each dot of white fluorescent body 21 and interval between dots are not specified, but it has been shown that setting both the dot diameter and interval to 1 to 3 mm will provide the highest brightness.

The light-diffusing/reflecting member 9 is a plate or film-shaped member of white color provided below the light-conducting plate 8 and diffuses and reflects the light emitted by the light-emitting diodes 11. Specifically, when the light-diffusing/reflecting member 9 is irradiated by the light transmitting through areas where white fluorescent bodies 21 are not provided, or the light transmitting through the white fluorescent bodies 21, the light-diffusing/reflecting member 9 will diffuse the corresponding light.

The light-emitting diode 11 emits visible light when forward-bias voltage is applied to the semiconductor PN junction. In this example, three types of light-emitting diodes 11 of different colors, namely a red diode emitting red light 23, green diode emitting green light 24 and blue diode emitting blue light 25, are provided, as shown in FIG. 6. These light-emitting diodes 11 are arranged along the side face of the light-conducting plate 8.

Specifically, a light-emitting diode array 26 having red diodes 23, green diodes 24 and blue diodes 25 arranged in a repeated pattern is stuck in the thickness direction of the light-conducting plate 8 in such a way that adjacent light-emitting diodes 11 have different colors. When the details are examined, the light-emitting diodes 11 in the stacking direction are not overlapping with one another, and the light-emitting diodes 11 are arranged so that the diodes in each diagonally facing pair have different colors (such as a green diode 24 and a blue diode 25 located diagonally below a red diode 23). In this manner, the three-color light-emitting diodes 11 are positioned uniformly on the side face of the light-conducting plate 8, and the distance between the nearest light-emitting diodes 11 of the same color is shorter than in a single-line configuration. For example, distance a–b is shorter than distance a—a in FIG. 6.

As shown in FIG. 3, the electrical circuit box 14 houses a control unit 34, a power circuit (not illustrated) and two power terminals connected to the power circuit (a first power terminal 28 and a second power terminal 29). Here, the first power terminal 28 is connected to the light-emitting means 12 and control unit 34 (refer to FIG. 7), etc., via an AC/DC converter and a power switch (not illustrated), etc. If the first power terminal 28 is connected to a power cable 31, connecting the power cable 31 to a commercial AC power outlet will allow for supply of operating power to the light-emitting means 12 and control unit 34, etc. On the other hand, the second power terminal 29 conducts the first power terminal 28, and connecting the second power terminal 29 to the first power terminal 28 of other surface light-emitting unit 1 installed adjacently via a power-distribution cable 32 will allow for supply of operating power to the other surface light-emitting unit 1. In other words, since multiple surface light-emitting units 1 can be connected in series via the power-distribution cable 32, when configuring a floor lighting system 2 using multiple surface light-emitting units 1 connecting the plug 31a of the power cable 31 connected to one surface light-emitting unit 1 to a commercial AC power outlet (not illustrated) will allow for supply of operating power to other surface light-emitting units 1 sequentially. As shown in FIG. 2, space K is created by a base metal 3 between the casing 4 and floor U. The power cable 31 and power-distribution cable 32 are wired through this space K. This way, the power cable 31 and power-distribution cable 32 can be wired without being exposed.

As shown in FIG. 7, the control unit 34 has a CPU 35 for controlling the illumination and blinking of the three types of light-emitting diodes 11 included in the light-emitting means 12. The CPU 35 corresponds to a microcomputer of the present invention and has a main storage means, calculation means and control means, among others. The CPU 35 performs bidirectional parallel communication via a signal line 36 between adjacent surface light-emitting units 1 and controls the illumination or blinking condition of the light-emitting diodes 11 according to the input signals. Specifically, the input port of the CPU 35 is connected to a detection sensor 37 that detects an approaching person or physical change in ambient brightness, temperature, etc., a row-address setting switch 38 and a column-address setting switch 39 for setting the installation position by row and column for each surface light-emitting unit 1 in the floor lighting system 2, a parent/child selector switch 40 for setting whether to let the subject surface light-emitting unit 1 in the floor lighting system 2 function as the parent unit or child unit, a control switch 41 for illuminating or blinking the light-emitting diodes 11 in a predefined pattern, and multiple emission-color selection switches 47 for selecting the emission color. The emission-color selection switches 47 include a red selection switch 42, green selection switch 43 and blue selection switch 44 for forcibly illuminating the red diode 23, green diode 24 and blue diode 25, respectively. In FIG. 7, only one row-address setting switch 38, one column-address setting switch 39 and one control switch 41 are shown. In actuality, however, multiple switches are provided to set multiple addresses and patterns. For example, if the system has 16 illumination patterns, 4 bits are required and therefore four control switches 41 are connected.

On the other hand, the output port of the CPU 35 is connected to LED drivers 46 that have a transistor 45 for controlling the power supply to the light-emitting diodes 11 and drive the light-emitting diodes 11 for each emission color. Here, the entire control unit 34 including the CPU 35, control switch 41 and emission-color selection switches 47 corresponds to the emission-color selection means of the present invention.

As shown in FIG. 9, the base metal 3 used for connecting surface light-emitting units 1 comprises an affixing plate 48 that contacts the mounting surface such as floor U and can be affixed to the mounting surface via fastening members such as screws (not illustrated), a supporting plate 49 that contacts the outer bottom face of the four corners 15 of the casing 4 and supports the casing 4, and a bolt-shaped rotating axis 51 rotatably supported by the top face of the affixing plate 48 and screwed to the center of the supporting plate 49. When the floor lighting system 2 is to be provided as a permanent installation, it is preferable that the affixing plate 48 be affixed to the mounting surface. However, if the floor lighting system 2 is to be installed only temporarily or for a limited period, the affixing plate 48 need not be affixed to floor U. In this case, no screw or other affixing marks will remain on floor U, so the system can be installed easily when installation is required only during an event held in a store or specific program presented in an exhibition venue.

Four projections 50 are formed on the top face of the supporting plate 49. These projections 50 have a semispherical shape and correspond to the concave sections (not illustrated) formed in the outer bottom faces of the four corners 15 of the casing 4. In other words, by aligning the casing 4 on the supporting plate 49 in a manner fitting the projections 50 into the concave sections, the casing 4 is properly positioned with respect to the base metal 3. In addition, since the rotating axis 51 is screwed to the supporting plate 49, turning the rotating axis 51 alone with respect to the supporting plate 49 will change the distance between the supporting plate 49 and affixing plate 48 due to the thrust generated by the screw, which will in turn change the height of the supporting plate 49. In effect, turning the respective rotating axes 51 will allow for adjustment of the casing 4 to a desired height.

The top edge of the rotating axis 51 projects above the top face of the projecting part 16 formed in the four corners 15 of the casing 4. Formed at this top edge is a hook 51a for engaging a nut-shaped fastening part 52. In other words, when the fastening part 52 is fitted onto the top edge of the rotating axis 51 with the casing 4 placed on the top face of the supporting plate 49, and then the fastening part 52 is turned slightly, the fastening part 52 will engage with the hook 52a and the bottom face of the fastening part 52 will contact the top face of the projecting part 16. As a result, the fastening part 52 restricts the movement of the casing 4 and prevents the four corners 15 of the casing 4 from lifting from the supporting plate 49. Here, a combination of the base metal 3, fastening part 52 and projecting part 16 corresponds the connection part of the present invention.

Next, the light-emitting action of the surface light-emitting unit 1 is explained. As shown in FIG. 5, the light emitted from the light-emitting means 12 travels through the clear light-conducting plate 8. Since multiple white fluorescent bodies 21 are provided on the reverse side of the light-conducting plate 8, when these white fluorescent bodies 21 are irradiated by a part of the light, the white fluorescent bodies 21 will respond to the stimulation of a specific wavelength and emit fluorescent light in color corresponding to the wavelength. As a result, the brightness of the light-conducting plate 8 will increase. In addition, the light transmitting through areas where white fluorescent bodies 21 are not provided, or the light transmitting through the white fluorescent bodies 21, irradiates the light-diffusing/reflecting member 9 located below the light-conducting plate 8. This causes the light to reflect on the light-diffusing/reflecting member 9 and diffuse to the surrounding area, thereby allowing a part of the light to be emitted from the surface of the light-conducting plate 8.

The light emitted to the surface of the light-conducting plate 8 transmits through the clear-resin diffusion plate 7 and transparent glass plate 6, and is emitted to the outside of the casing 4. Since the clear-resin diffusion plate 7 diffuses the transmitting light, the outline of the internal parts becomes blurred when viewed from the surface of the transparent glass plate 6, and at the same time the light-conducting plate 8 is illuminated in a planar pattern. In other words, the light-conducting plate 8 functions as a surface light source and illuminates the entire surface of the transparent glass plate 6.

In addition, the light-emitting means 12 comprises a red diode 23, green diode 24 and blue diode 25 emitting three primary colors, respectively, and the illumination condition is controlled for each emission color. Therefore, not only red, green and blue lights but also lights of full colors generated by different combinations of these colors can be emitted from the transparent glass plate 6. Particularly since the light-emitting diodes 11 are stuck in two layers, and the three-color light-emitting diodes 11 are positioned uniformly on the side face of the light-conducting plate 8, brightness difference can be suppressed and unevenness of color minimized for any light generated by a given diode combination.

Next, the processing that takes place in the CPU 35 provided in the surface light-emitting unit 1 is explained according to FIG. 8. When the power switch is turned on (contacts are closed; YES in step S1) the CPU 35 judges the condition of the parent/child selector switch 40. If the switch is set to "parent unit" (YES in step S2), the CPU executes the processing of steps S3 through S7. Here, the processing of step S2 corresponds to the judgment means of the present invention.

In step S3, judgment is made as to whether or not at least any one of the emission-color selection switches 47, namely the red selection switch 42, green selection switch 43 and blue selection switch 44, is turned on. If any of these switches is turned on (YES in step S3), the light-emitting diode 11 corresponding to the selected emission-color selection switch 47 will be illuminated (step S4). For example, if the red selection switch 42 alone is turned on, the CPU will perform control in such a way that only the red diode 23 will be illuminated. If the blue selection switch 44 alone is turned on, the CPU will perform control in such a way that only the blue diode 25 will be illuminated. If both the red selection switch 42 and green selection switch 43 are turned on, the CPU will perform control in such a way that both the red diode 23 and green diode 24 will be illuminated. Furthermore, if all emission-light selection switches 47 are turned on, the CPU will perform control in such a way that the red diode 23, green diode 24 and blue diode 25 will all be illuminated.

The CPU 35 also sends a command (light-emission information) to other surface light-emitting unit 1 to cause such other surface light-emitting unit 1 to emit light of the same color as the own unit (step S5). If the power switch is not turned off (contacts are open; NO in step S8), the process will return to step S2. In other words, if the parent/child selector switch 40 and selected emission-color selection switch 47 are not changed, the processing of steps S4 and S5 will be repeated and the light-emitting diode 11 of the specified emission color will be illuminated continuously. Although the process is not illustrated, any detection of an approaching person or physical change by a detection sensor 37 during the processing of step S4 or S5 will trigger an interruption process and the illumination will be controlled to a specified pattern.

If none of the emission-color selection switches 27 is selected in step S3 (NO), the light-emitting diodes 11 will be illuminated or blinked according to the light-emission pattern set by the control switch 41 (step S6). Thereafter, the CPU will proceed to the processing of step S5 and send a command (light-emission information) to other surface light-emitting unit 1 so that such other surface light-emitting unit 1 will illuminate in the same illumination pattern as the own unit or in accordance with the address (installation position) of the surface light-emitting unit 1. If the parent/child selector switch 40 and selected emission-color selection switch 47 are not changed, the processing of steps S6 and S5 will be repeated and the entire floor lighting system 2 will be controlled according to a specified illumination pattern. For example, it is possible to blink all surface light-emitting units 1 in the sequence of red, yellow, green, cyan, blue, magenta and white and repeat this illumination pattern.

On the other hand, if the parent/child selector switch 40 is set to "child unit" (NO in step S2), the light-emitting diodes 11 will be illuminated or blinked according to the command sent from the "parent unit" (step S7). For example, if the emission color of the "parent unit" remains the same, the light-emitting diodes 11 will be controlled in such a way that the emission color matches the color of the "parent unit." If the emission color of the "parent unit" changes in accordance with an illumination pattern, the light-emitting diodes 11 will be controlled according to the pattern. Thereafter, the CPU will proceed to the processing of step S5 and send the command sent from the "parent unit" and received by the CPU to other adjacent surface light-emitting unit 1. If the signal lines of multiple surface light-emitting units 1 are connected in series, the surface light-emitting unit 1 set as "parent unit" cannot send a command simultaneously to other multiple surface light-emitting units 1. Therefore, each surface light-emitting unit 1 set as "child unit" will transmit the command received via the signal line to other surface light-emitting unit 1 via other signal line. This process is not required if command transmission is implemented wirelessly. Thus the processing of steps S7 and S5 will be repeated until the power switch is turned off or the parent/child selector switch 40 is changed. Here, the above processing of steps S3 through S7 corresponds to the light-emission control means of the present invention.

As explained above, the surface light-emitting unit 1 given in this example allows for creation of light fantasy and illusion using the three-color light-emitting diodes 11 to help improve the view and esthetic look of the interior of a building. The surface light-emitting unit 1 also has the light-conducting plate 8 and transparent glass plate 6 stacked on top of each other, while the light-emitting diodes 11 are arranged on the side face of the transparent glass plate 6. As a result, the casing 4 becomes very thin and the projection above floor U can be kept relatively low. This reduces the limitations on the installation location of the surface light-emitting unit 1 as well as the difficulty associated with stepping up/down the unit.

Unlike conventional systems, the surface light-emitting unit 1 given in this example requires no large-scale construction work and allows for configuration of a system of appropriate size according to the floor area. For example, the needs for producing artistic or decorative effects using light only during an event held in a store or specific program presented in an exhibition venue can be addressed easily.

The surface light-emitting unit 1 given in this example utilizes a transparent glass plate 6 as its surface member in order to suppress clouding due to scratches and also maintain transparency over a long period. As a result, drop in the light quantity emitted from the surface of the transparent glass plate 6 can be suppressed to maintain brightness. In addition, multiple projections 19 ensure safety by preventing slipping by people walking on top.

In addition, the surface light-emitting unit 1 given in this example can uniformly illuminate the roughly entire surface of the transparent glass plate 6 regardless of the color of emitted light. The white fluorescent bodies 21 also achieve significant increase in the brightness of the light-conducting plate 8. As a result, the esthetic look can be enhanced without increasing the production costs. Particularly since the light-emitting diodes 11 rarely experience a blown bulb and therefore require little replacement, the maintenance work of the manager can be reduced.

Furthermore, the surface light-emitting unit 1 given in this example utilizes space K between the casing 4 and floor U to wire the power cable 31 and power-distribution cable 32. Therefore, the cables are not exposed and this helps enhance the appearance. Particularly since multiple surface light-emitting units 1 can be connected in series using the power-distribution cable 32, complexity of wiring can be suppressed and operating power can be supplied reliably to all surface light-emitting units 1 regardless of the number of surface light-emitting units 1 installed.

The preferred embodiment of the present invention has been explained in the foregoing. However, the present invention is not limited to this embodiment alone. Instead, as explained below its design can be improved or modified in various ways as long as such improvement or modification does not deviate from the key points of the present invention.

Figure 10:
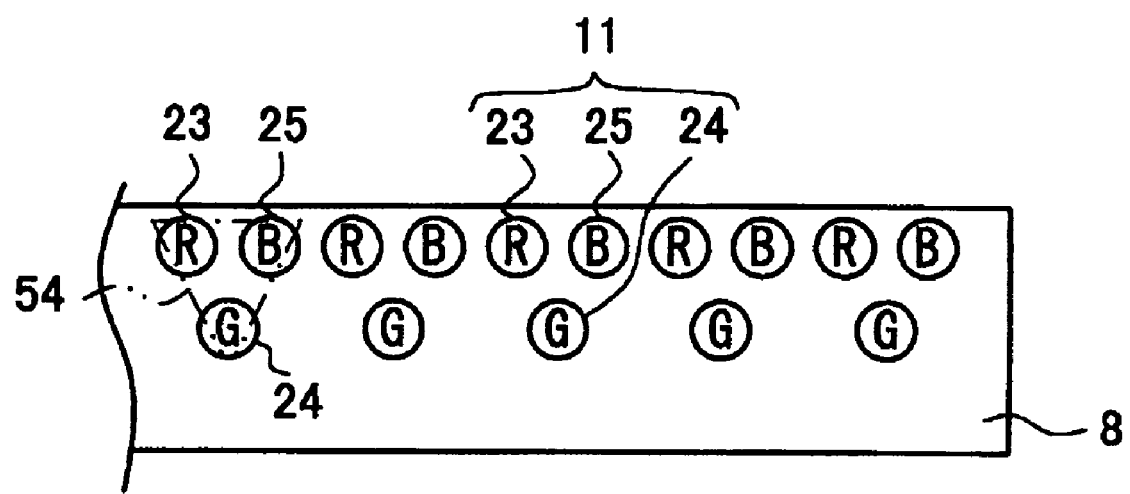
FIG. 10 is a schematic diagram illustrating other arrangement of light-emitting diodes in the surface light-emitting unit.

For example, the above embodiment illustrates a light-emitting means 12 consisting of two rows of light-emitting diode arrays 26 stacked in the vertical direction. However, the arrangement of light-emitting diodes 11 is not limited to this pattern and, for example, the arrangement shown in FIG. 10 is also possible. Here, groups of light-emitting diodes 54, each comprising three-color diodes, namely red diode 23, green diode 24 and blue diode 25, arranged in a reverse-triangular shape, are installed in a single line along the side face of the light-conducting plate 8. In this case, the interval of an adjacent pair of light-emitting diodes 11 of a given color is shorter than when three-color light-emitting diodes 11 are arranged side by side in a single line, and therefore installation of many light-emitting diodes 11 becomes possible. As a result, the light emitted from the transparent glass plate 6 will become roughly uniform and the overall brightness will increase.

Figure 11:
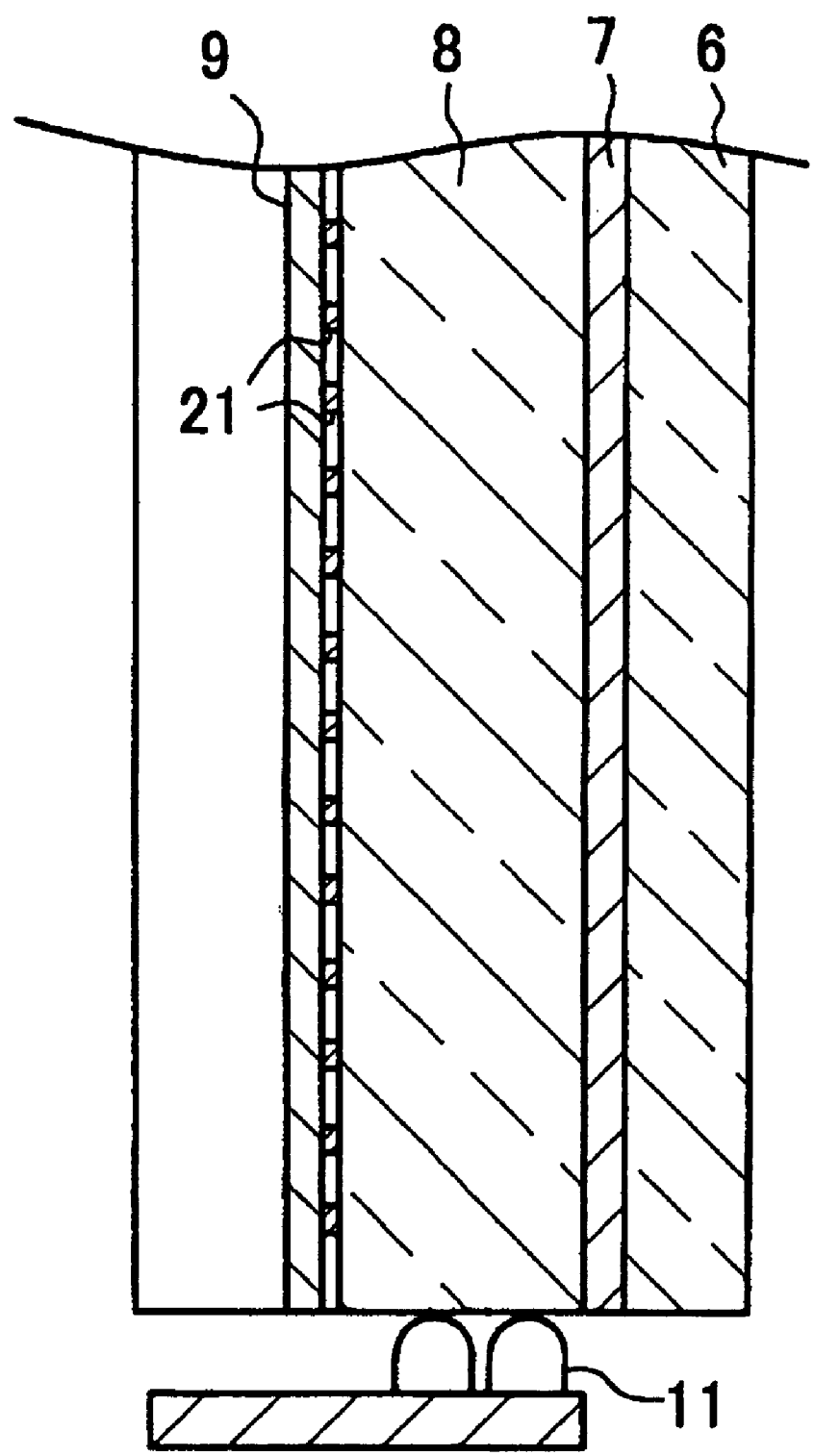
FIG. 11 is a schematic diagram illustrating other application of the surface light-emitting unit.

In addition, the above embodiment illustrates a case where the surface light-emitting unit 1 is installed on a horizontal surface, namely floor U. However, as shown in FIG. 11, the surface light-emitting unit 1 can also be positioned vertically in such a way that the transparent glass plate 6 faces the front. In other words, the surface light-emitting unit 1 can be installed in a window or on a wall of a building to provide lighting effect for the window or wall. In this application, there is no worry about people slipping over the unit and therefore projections 29 are no longer necessary.

In the above embodiment, multiple surface light-emitting units 1 are connected using base metals 3. However, it is also possible to provide concave/convex shapes on the side face of the casing 4 of the surface light-emitting unit 1 for fitting with other adjacent surface light-emitting unit 1 in such a way that the concave section on the casing 4 of one unit is fitted with the convex section on the casing 4 of the other unit to connect the two units. In addition, in the above embodiment space K is created between the casing 4 and floor U using a base metal 3 (i.e., connection fitting). However, another member (such as spacer) can be provided, instead of the connection fitting, to create space K for wiring.

In addition, the above embodiment uses signal transmission via bidirectional parallel communication by way of connecting a signal line 36 to the CPU 35 of the surface light-emitting unit 1. However, the communication method is not limited to this mode and, for example, serial communication can also be used. It is also possible to implement signal transmission through a wireless method utilizing infrared light or ultrasonic wave.

Furthermore, in the above embodiment light is emitted from the entire surface of the transparent glass plate 6. However, it is also possible, for example, to provide a nameplate having holes shaped in letters, etc., below the transparent glass plate 6 in order to emit light only from the letters. Alternatively, the letters may be made opaque and the background surrounding the letters transparent. Either way, letters identifying the name of a venue or entrance/exit are made visually recognizable to allow for easy, smooth navigation of visitors, etc., in addition to providing artistic effects.

Figure 12:
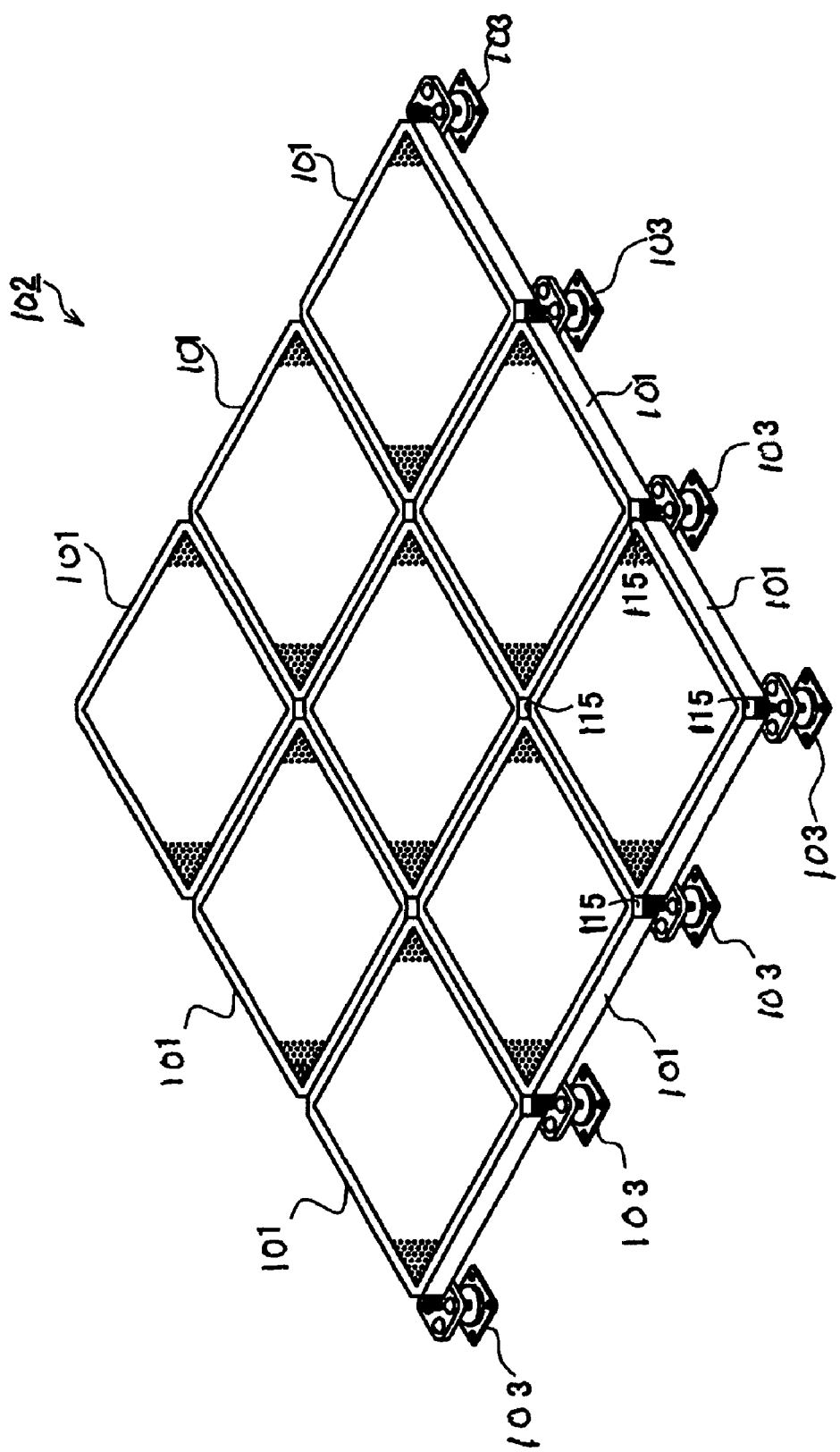
FIG. 12 is a perspective view illustrating a floor lighting system configured with the light-emitting unit of a second embodiment of the present invention.
Figure 13:
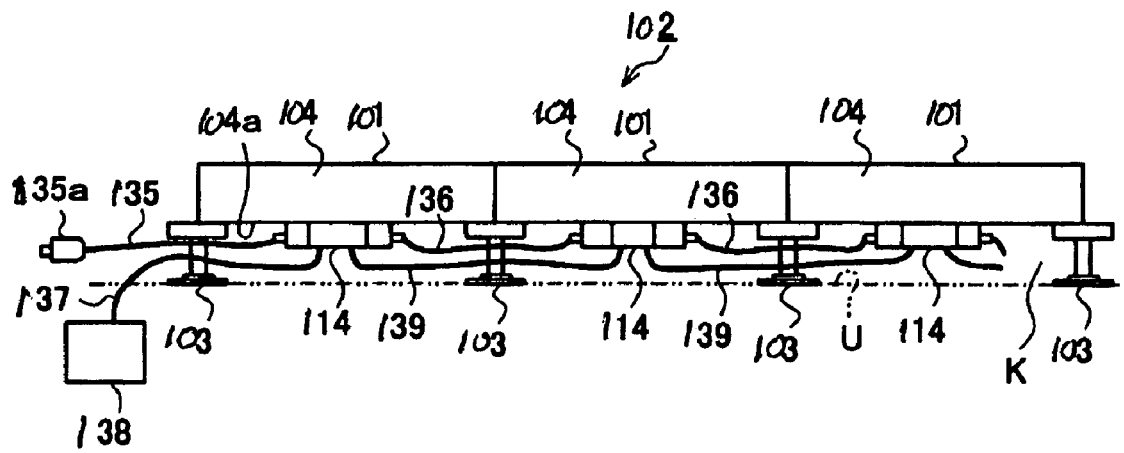
FIG. 13 is a side view illustrating the structure of the floor lighting system of the second embodiment.
Figure 14:
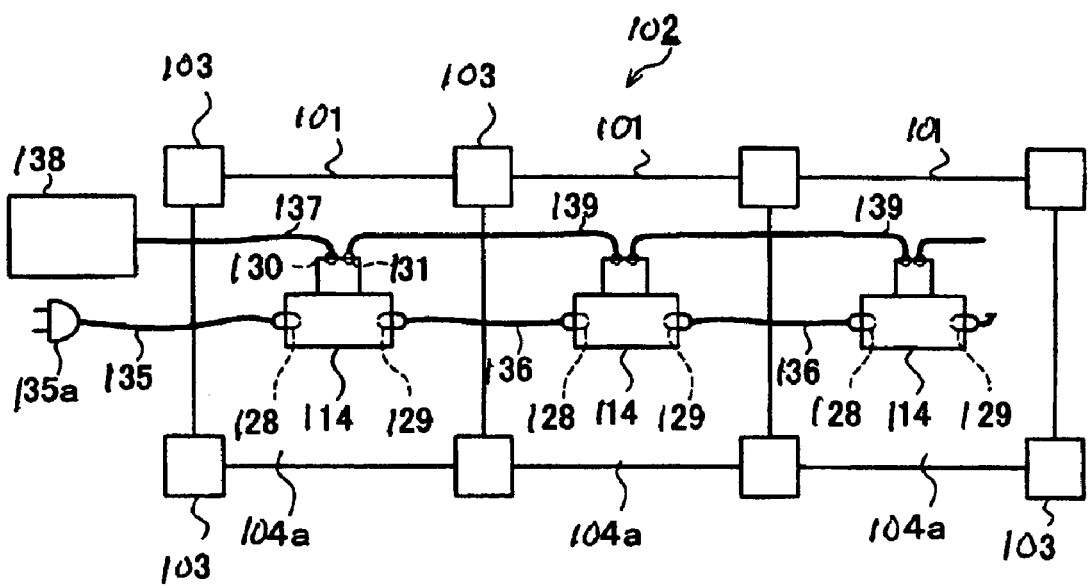
FIG. 14 is a bottom view illustrating the structure of the floor lighting system of the second embodiment.
Figure 15:
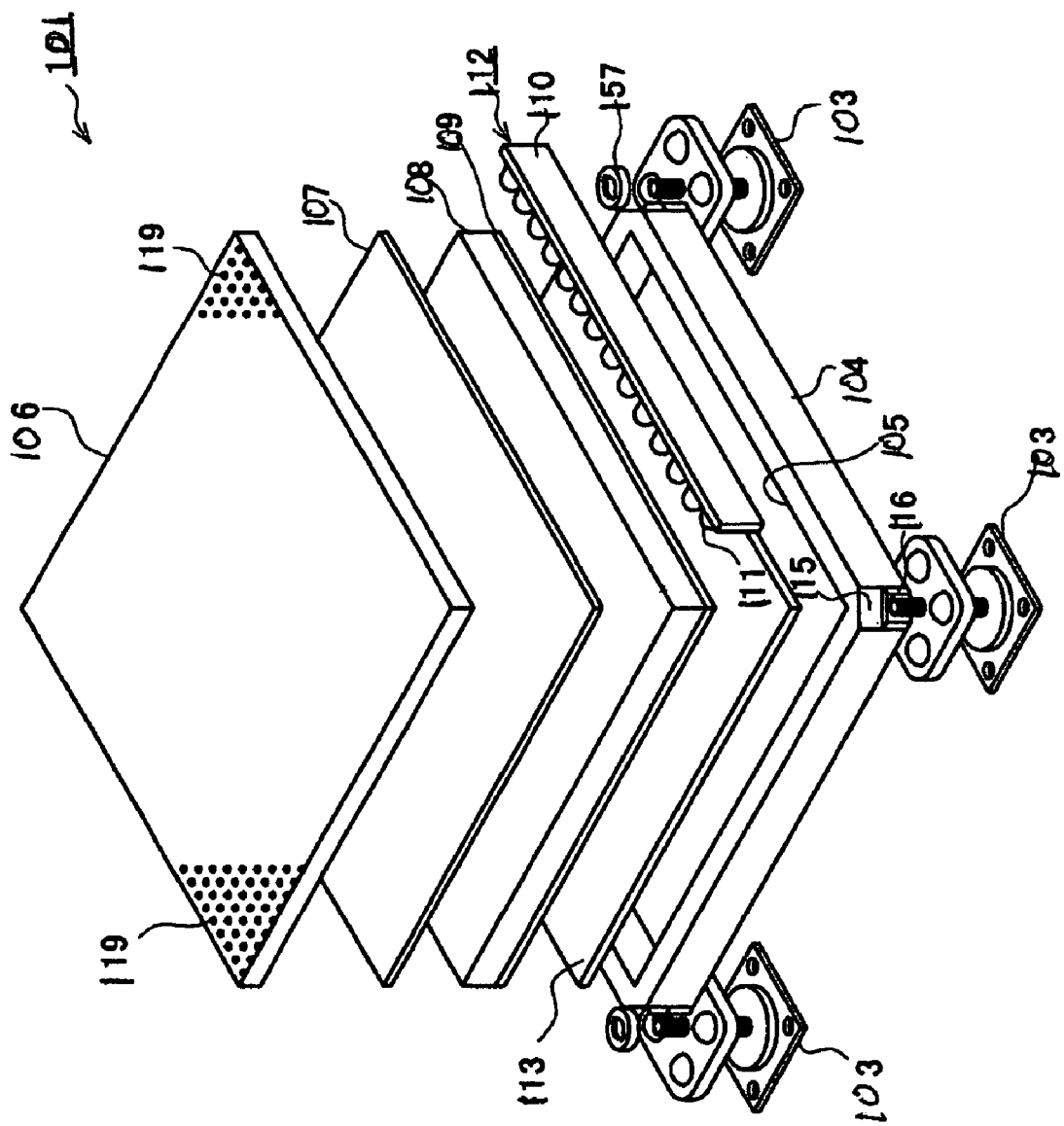
FIG. 15 is an exploded perspective view illustrating the structure of key parts of the light-emitting unit in the second embodiment of the present invention.
Figure 16:
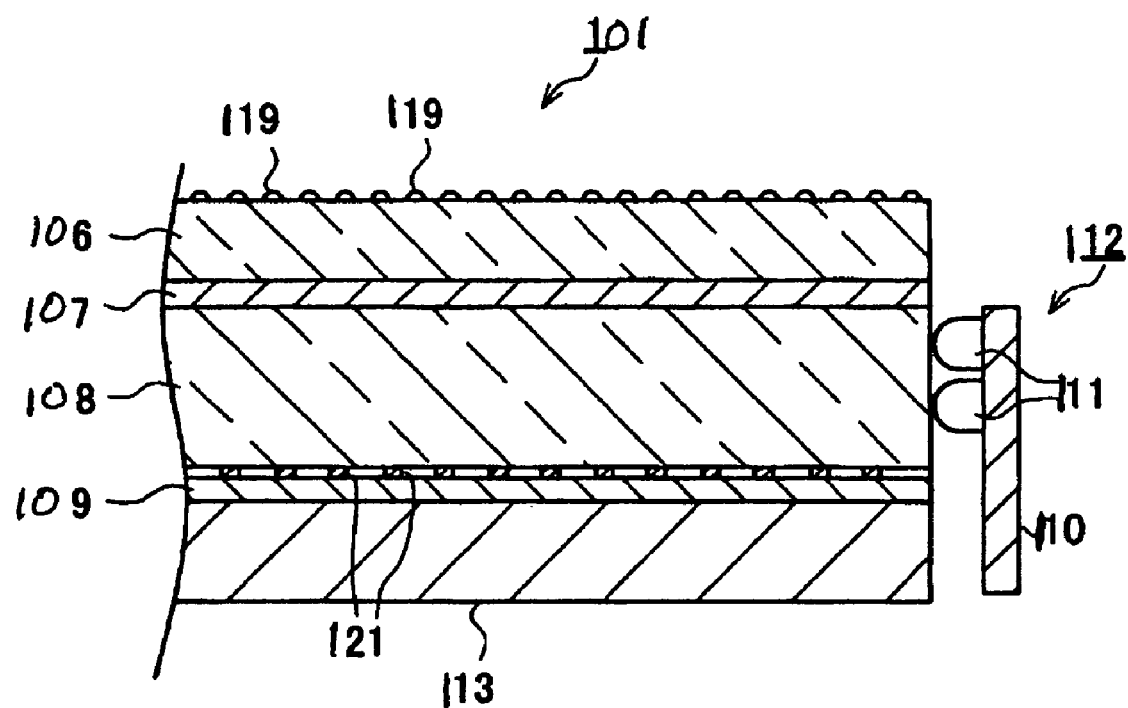
FIG. 16 is a section view illustrating the internal structure of the light-emitting unit of the second embodiment.
Figure 17:
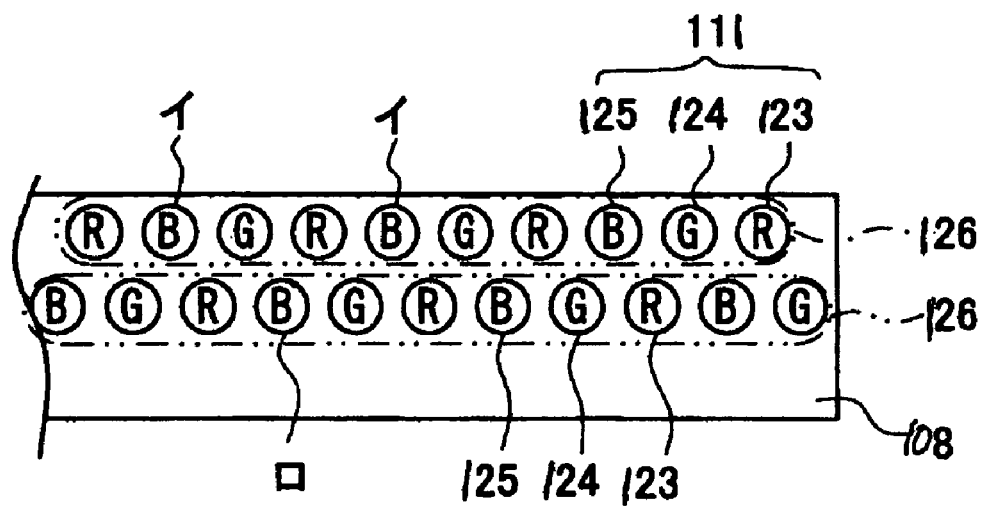
FIG. 17 is a schematic diagram illustrating the layout of light-emitting diodes in the light-emitting unit of the second embodiment.
Figure 18:
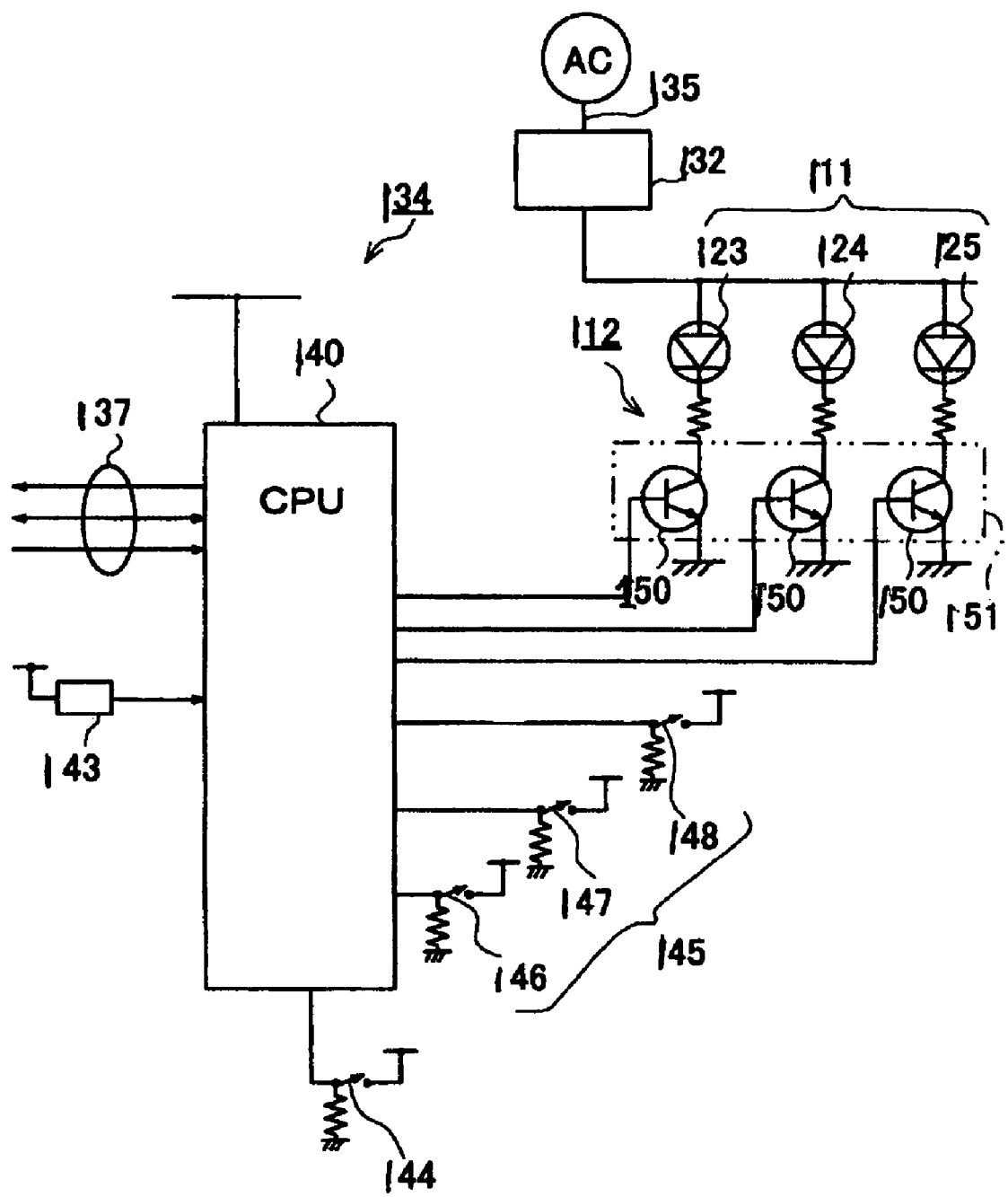
FIG. 18 is a circuit diagram illustrating the structure of the electrical circuit provided in the control unit of the light-emitting unit in the second embodiment.
Figure 19:
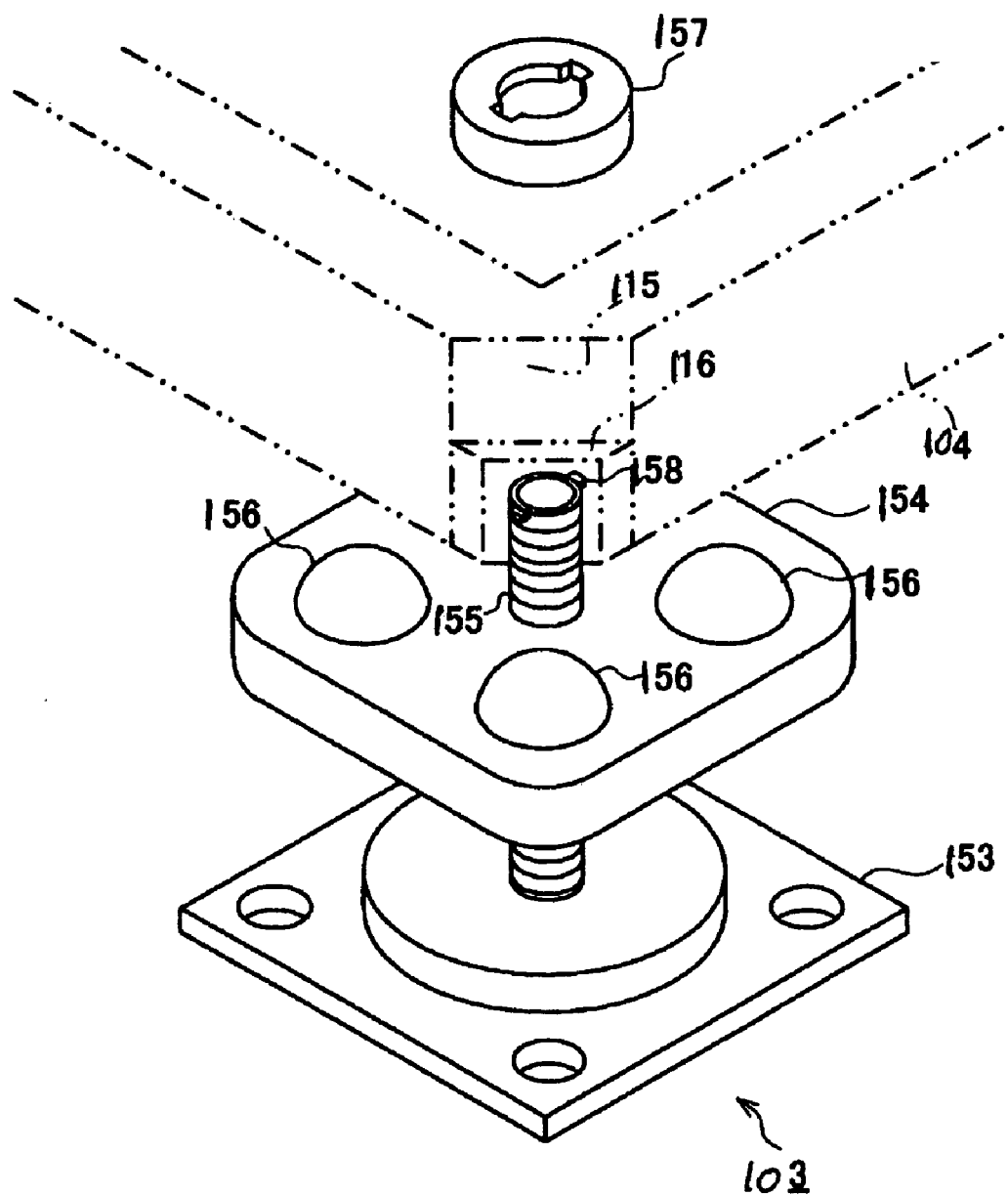
FIG. 19 is an enlarged perspective view illustrating the structure of the base metal used with the light-emitting unit in the second embodiment.

Another embodiment of the light-emitting unit given by the present invention is explained according to FIGS. 12 through 19. FIGS. 12 through 14 provide a perspective view, side view and bottom view of a floor lighting system combining multiple light-emitting units, while FIG. 15 gives an exploded perspective view of the light-emitting unit. FIG. 16 is a section view illustrating the structure of key parts of the light-emitting unit, FIG. 17 is an explanation drawing showing the arrangement of light-emitting diodes, FIG. 18 gives a circuit diagram for the control unit, and FIG. 19 provides an enlarged perspective view illustrating the structure of the base metal.

The floor lighting system 102 given in this example combines multiple light-emitting units 101 on a flat surface, as shown in FIGS. 12 through 14, and is installed on a floor U of a structure, for example. FIG. 12 illustrates a system comprising nine light-emitting units 101, but the number of light-emitting units 101 that can be combined is not limited. Instead, the number can be set arbitrarily depending on the size, shape and other properties of the installation floor (floor U). The light-emitting unit 101 given in the this example has a 500×500 mm square shape, which allows for configuration of a floor lighting system 102 of a rectangular or square shape whose side has a length corresponding to an integer multiple of 500 mm, by way of combining multiple light-emitting units 101.

These light-emitting units 101 are connected via base metals 103. The specific structure of the base metal 103 is explained later. A base metal is installed in the four corners 115 of the light-emitting unit 101, in order to connect adjacent light-emitting units 101 and at the same time function as a spacer for defining a space K between the casing 104 of the light-emitting unit 101 and floor U. The height of the base metal 103 is adjustable in the vertical direction, preventing looseness of the light-emitting unit 101 and ensuring its stable installation.

As shown in FIGS. 15 and 16, the box-shaped casing 104 with an opening 105 in its top surface contains a light-emitting laminated structure that has, from top to bottom, a transparent glass plate 106, clear-resin diffusion plate 107, light-conducting plate 108 and light-diffusing/reflecting member 109, and a light-emitting means 112 comprising the multiple light-emitting diodes 111 installed on a board 110 is provided with respect to one side of the light-conducting plate 108. If necessary, the light-emitting means 112 can be provided with respect to each side (i.e., on four sides) of the light-conducting plate 108. A plate-shaped spacer 113 is provided between the inner bottom face of the casing 104 and the light-diffusing/reflecting member 109 in order to secure a space for storing the board 110 of the light-emitting means 112, and an electrical circuit box 114 (refer to FIGS. 13 and 14) is mounted on the outer bottom face of the casing 104.

The above structure is explained in details. The casing 104 is a thin enclosure formed, for example, by metal plate material, and its planar shape is roughly square. As shown in FIGS. 12 and 15, the four corners 115 of the casing 104 have a triangular notch, which creates a quadrangular hole when four light-emitting units 101 are combined into a square shape. The shape of the notched four corners 115 is not symmetrical in the vertical direction of the casing 104, but the lower side of the notch projects further outward than the upper side. In other words, a projecting part 116 is created in the lower side of the four corners 115.

As shown in FIGS. 15 and 16, the transparent glass plate 106 is formed by an achromatic, clear laminated glass or other material of approx. 8 mm in thickness, and multiple projections 119 made of blocks of fine glass particles are formed on its surface. These projections 119 generate appropriate resistance on the glass surface to prevent people walking on top from slipping. The size of the projection 119 is not specified, but setting its diameter to approx. 0.5 to 3 mm will effectively prevent slipping.

The following is a brief explanation of the production method of this transparent glass plate 106 having projections 119. First, adhesive for fine glass particles is applied on the glass plate surface in a specified pattern. Then, fine glass particles having a softening point lower than that of the glass plate are scattered on the glass plate surface to let them adhere to the adhesive for fine glass particles. Thereafter, fine glass particles not adhering to the adhesive for fine glass particles are removed by vacuuming or other means. Next, the glass plate with fine glass particles attached is thermally treated to fuse the fine glass particles onto the glass plate surface, after which the plate is cooled. Through this process, projections 119 are formed in a specified pattern on the glass plate surface.

The clear-resin diffusion plate 107 is a generally known plate-shaped member and diffuses the transmitting light to make it difficult to view the shape of the member located below, while emitting the light in a planar pattern.

The light-conducting plate 108 is a plate material formed by clear resin (such as an acrylic plate), and its surface size is roughly equivalent to that of the transparent glass plate 106. The thickness of the light-conducting plate 108 is not specified, but it should preferably be approx. 10 mm. As shown in FIG. 16, dot-shaped white fluorescent bodies 121 are arranged at specified intervals on the rear face of the light-conducting plate 108. These white fluorescent bodies 121 are formed by white fluorescent paint, for example, and emit fluorescent light in color corresponding to the wavelength of the light emitted by the light-emitting diodes 111. The size of each dot of white fluorescent body 121 and interval between dots are not specified, but it has been shown that setting both the dot diameter and interval to 1 to 3 mm will provide the highest brightness.

The light-diffusing/reflecting member 109 is a plate or film-shaped member of white color provided below the light-conducting plate 108 and diffuses and reflects the light emitted by the light-emitting diodes 111. Specifically, when the light-diffusing/reflecting member 109 is irradiated by the light transmitting through areas where white fluorescent bodies 121 are not provided, or the light transmitting through the white fluorescent bodies 121, the light-diffusing/reflecting member 109 will diffuse the corresponding light.

The light-emitting diode 111 emits visible light when forward-bias voltage is applied to the semiconductor PN junction. In this example, three types of light-emitting diodes 111 of different colors, namely a red diode emitting red light 123, green diode emitting green light 124 and blue diode emitting blue light 125, are provided, as shown in FIG. 17. These light-emitting diodes 111 are arranged along the side face of the light-conducting plate 108.

Specifically, a light-emitting diode array 126 having red diodes 123, green diodes 124 and blue diodes 125 arranged in a repeated pattern is stuck in the thickness direction of the light-conducting plate 108 in such a way that adjacent light-emitting diodes 111 have different colors. When the details are examined, the light-emitting diodes 111 in the stacking direction are not overlapping with one another, and the light-emitting diodes 111 are arranged so that the diodes in each diagonally facing pair have different colors (such as a green diode 124 and a blue diode 125 located diagonally below a red diode 123). In this manner, the three-color light-emitting diodes 111 are positioned uniformly on the side face of the light-conducting plate 108, and the distance between the nearest light-emitting diodes 111 of the same color is shorter than in a single-line configuration. For example, distance a–b is shorter than distance a—a in FIG. 17.

As shown in FIG. 14, the electrical circuit box 114 houses a control unit 134 (refer to FIG. 18), a power circuit (not illustrated), two power terminals connected to the power circuit (a first power terminal 128 and a second power terminal 129), and two signal terminals connected to the control unit 134 (a first signal terminal 130 and a second signal terminal 131). Here, the first power terminal 128 is connected to the light-emitting means 112 and control unit 134, etc., via an AC/DC converter 132 (refer to FIG. 18) and a power switch (not illustrated), etc. If the first power terminal 128 is connected to a power cable 135, connecting the plug 135a of the power cable 135 to a commercial AC power outlet will allow for supply of operating power to the light-emitting means 112 and control unit 134, etc. On the other hand, the second power terminal 129 conducts the first power terminal 128, and connecting the second power terminal 129 to the first power terminal 128 of other light-emitting unit 101 installed adjacently via a power-transmission cable 136 will allow for supply of operating power to the other light-emitting unit 101. In other words, since multiple light-emitting units 101 can be connected in series via the power-transmission cable 136, connecting the plug 135a of the power cable 135 connected to one light-emitting unit 101 to a commercial AC power outlet (not illustrated) will allow for supply of operating power to all light-emitting units 101 sequentially. The other light-emitting unit 101, which is connected via the power-transmission cable 136, has this power-transmission cable 136 connected to its first power terminal 128. In other words, when the other light-emitting unit 101 is considered the main unit, the power-transmission cable 136 functions as a power cable that supplies commercial AC power.

On the other hand, if a reception cable 137 is connected to the first signal terminal 130, connecting the other end of the reception cable 137 to a dimming console 138 will allow for reception of DMX signal from the dimming console 138. The second signal terminal 131 conducts the first signal terminal 130, and connecting the second signal terminal 131 to the first signal terminal 130 of other light-emitting unit 101 installed adjacently via a transmission cable 139 will allow for transmission of DMX signal to the other light-emitting unit 101. In other words, since multiple light-emitting units 101 can be connected in series via each transmission cable, when configuring a floor lighting system 102 using multiple light-emitting units 101 simply connecting the reception cable 137 between one light-emitting unit 101 and the dimming console 138 will allow for supply of DMX signal to other light-emitting units 101 sequentially. Here, "DMX signal" refers to an internationally standardized high-speed digital signal called "DMX 512 signal," and conforms to the dimming signal standard. The DMX 512 signal has 512 channels and allows for serial transmission of a maximum of 512 sets of data, enabling control of many light-emitting units 101 individually and simultaneously. Although not illustrated, many operating levers and buttons are provided on the dimming console 138 that can be used to set the data sent by the DMX 512 signal. In short, by storing a program of lighting effect patterns in the dimming console 138 in advance, dimming control signals and operation control signals can be transmitted serially according to the program.

As shown in FIG. 13, space K is created by a base metal 103 between the casing 104 and floor U. The power cable 135, power-transmission cable 136, reception cable 137 and transmission cable 139 are wired through this space K. This way, these cables 135, 136, 137, and 139 can be wired without being exposed.

As shown in FIG. 18, the control unit 134 has a CPU 140 for controlling the illumination and blinking of the three types of light-emitting diodes 111 included in the light-emitting means 112. The CPU 140 has a main storage means, calculation means and control means, among others, and controls the power supply to the light-emitting means 112 based on the DMX signal received. Specifically, it uses the DMX signal to select the light-emitting diode 111 to be illuminated or blinked from among those provided in the light-emitting means 112, and supplies power to the selected diode. The input port of the CPU 140 is connected to DIP switches 143 that are used to allocate the individual light-emitting units 101, and the CPU 140 performs control according to its own address set by the DIP switches 143.

The input port of the CPU 140 is also connected to a mode selector switch 144 and multiple emission-color selection switches 145. By switching to individual setting mode using the mode selector switch 144, the light-emitting diode 111 of the color selected by an appropriate emission-color selection switch 145 can be illuminated. The emission-color selection switches 145 include a red selection switch 146, green selection switch 147 and blue selection switch 148 for forcibly illuminating the red diode 123, green diode 124 and blue diode 125, respectively.

On the other hand, the output port of the CPU 140 has a transistor 150 for controlling the power supply to the light-emitting diodes 111 and is connected to LED drivers 151 that drive the light-emitting diodes 111 for each emission color. Here, the CPU 140 corresponds to the light-emission control means and emission-color selection means of the present invention.

As shown in FIG. 19, the base metal 103 used for connecting light-emitting units 101 comprises an affixing plate 153 that contacts the mounting surface such as floor U and can be affixed to the mounting surface via fastening members such as screws (not illustrated), a supporting plate 154 that contacts the outer bottom face of the four corners 115 of the casing 104 and supports the casing 104, and a bolt-shaped rotating axis 155 rotatably supported by the top face of the affixing plate 153 and screwed to the center of the supporting plate 154. When the floor lighting system 102 is to be provided as a permanent installation, it is preferable that the affixing plate 153 be affixed to the mounting surface. However, if the floor lighting system 102 is to be installed only temporarily or for a limited period, the affixing plate 153 need not be affixed to floor U. In this case, no screw or other affixing marks will remain on floor U, so the system can be installed easily when installation is required only during an event held in a store or specific program presented in an exhibition venue.

Four projections 156 are formed on the top face of the supporting plate 154. These projections 156 have a semi-spherical shape and correspond to the concave sections (not illustrated) formed in the outer bottom faces of the four corners 115 of the casing 104. In other words, by aligning the casing 104 on the supporting plate 154 in a manner fitting the projections 156 into the concave sections, the casing 104 is properly positioned with respect to the base metal 103. In addition, since the rotating axis 155 is screwed to the supporting plate 154, turning the rotating axis 155 alone with respect to the supporting plate 154 will change the distance between the supporting plate 154 and affixing plate 153 due to the thrust generated by the screw, which will in turn change the height of the supporting plate 154. In effect, turning the respective rotating axes 155 will allow for adjustment of the casing 104 to a desired height.

The top edge of the rotating axis 155 projects above the top face of the projecting part 116 formed in the four corners 115 of the casing 104. Formed at this top edge is a hook 158 for engaging a nut-shaped fastening part 157. In other words, when the fastening part 157 is fitted onto the top edge of the rotating axis 155 with the casing 104 placed on the top face of the supporting plate 154, and then the fastening part 157 is turned slightly, the fastening part 157 will engage with the hook 158 and the bottom face of the fastening part 157 will contact the top face of the projecting part 116. As a result, the fastening part 157 restricts the movement of the casing 104 and prevents the four corners 115 of the casing 104 from lifting from the supporting plate 154. Here, a combination of the base metal 103, fastening part 157 and projecting part 116 corresponds the connection part of the present invention. The structure for fastening the casing 104 is not limited, and may comprise, for example, a metal contacting the top face of the projecting part 116 and a bolt that screws such metal onto the top face of the supporting plate 154, instead of the nut-shaped fastening part 157.

Next, the light-emitting action of the light-emitting unit 101 is explained. As shown in FIG. 16, the light emitted from the light-emitting means 112 travels through the clear light-conducting plate 108. Since multiple white fluorescent bodies 121 are provided on the reverse side of the light-conducting plate 108, when these white fluorescent bodies 121 are irradiated by a part of the light, the white fluorescent bodies 121 will respond to the stimulation of a specific wavelength and emit fluorescent light in color corresponding to the wavelength. As a result, the brightness of the light-conducting plate 108 will increase. In addition, the light transmitting through areas where white fluorescent bodies 121 are not provided, or the light transmitting through the white fluorescent bodies 121, irradiates the light-diffusing/reflecting member 109 located below the light-conducting plate 108. This causes the light to reflect on the light-diffusing/reflecting member 109 and diffuse to the surrounding area, thereby allowing a part of the light to be emitted from the surface of the light-conducting plate 108.

The light emitted to the surface of the light-conducting plate 108 transmits through the clear-resin diffusion plate 107 and transparent glass plate 106, and is emitted to the outside of the casing 104. Since the clear-resin diffusion plate 107 diffuses the transmitting light, the outline of the internal parts becomes blurred when viewed from the surface of the transparent glass plate 106, and at the same time the light-conducting plate 108 is illuminated in a planar pattern. In other words, the light-conducting plate 108 functions as a surface light source and illuminates the entire surface of the transparent glass plate 106.

In addition, the light-emitting means 112 is equipped with a red diode 123, green diode 124 and blue diode 125 emitting three primary colors, respectively, and the illumination condition is controlled for each emission color. Therefore, not only red, green and blue lights but also lights of full colors generated by different combinations of these colors can be emitted from the transparent glass plate 106. Particularly since the light-emitting diodes 111 are stuck in two layers, and the three-color light-emitting diodes 111 are positioned uniformly on the side face of the light-conducting plate 108, brightness difference can be suppressed and unevenness of color minimized for any light generated by a given diode combination.

As explained above, the light-emitting unit 101 given in this example requires only one light-emitting unit 101 to be connected directly to the commercial AC power outlet and dimming console 138, even when a floor lighting system 102 is configured by multiple light-emitting units 101, which eliminates the need for a dimming panel required in conventional systems. This not only simplifies the overall structure but also facilitates the construction of a floor lighting system 102. Specifically, there are no longer limitations on the installation location, etc., that must be observed in order to transmit power and data. In addition, the distance between adjacent light-emitting units 101 is constant, and light-emitting units 101 can be inter-connected using relatively short cables. This prevents the wiring of the power-transmission cable 136, transmission cable 139, etc., from becoming complicated. As a result, light-emitting units 101 can be inter-connected easily and in a more esthetically appealing manner. Since the illumination patterns of multiple light-emitting diodes 111 are controlled in accordance with DMX signal, light fantasy and other desired effects can be achieved simply by connecting a commercially available dimming console 138.

In addition, the light-emitting unit 101 given in this example utilizes space K between the casing 104 and floor U to wire the cables 135, 136, 137 and 139. Therefore, the cables are not exposed and this helps enhance the appearance. Particularly since multiple light-emitting units 101 can be connected in series using power-transmission cables 136, complexity of wiring can be suppressed and operating power can be supplied reliably to all light-emitting units 101 regardless of the number of light-emitting units 101 installed.

In addition, the light-emitting unit 101 given in this example allows for creation of light fantasy and illusion using the three-color light-emitting diodes 111 to help improve the view and esthetic look of the interior of a building. The light-emitting unit 101 also has the light-conducting plate 108 and transparent glass plate 106 stacked on top of each other, while the light-emitting diodes 111 are arranged on the side face of the transparent glass plate 106. As a result, the casing 104 becomes very thin and the projection above floor U can be kept relatively low. This reduces the limitations on the installation location of the light-emitting unit 101 as well as the difficulty associated with stepping up/down the unit.

Unlike conventional systems, the light-emitting unit 101 given in this example requires no large-scale construction work and allows for configuration of a system of appropriate size according to the floor area. For example, the needs for producing artistic or decorative effects using light only during an event held in a store or specific program presented in an exhibition venue can be addressed easily.

The light-emitting unit 101 given in this example utilizes a transparent glass plate 106 as its surface member in order to suppress clouding due to scratches and also maintain transparency over a long period. As a result, drop in the light quantity emitted from the surface of the transparent glass plate 106 can be suppressed to maintain brightness. In addition, multiple projections 119 ensure safety by preventing slipping by people walking on top.

Furthermore, the light-emitting unit 101 given in this example can uniformly illuminate the roughly entire surface of the transparent glass plate 106 regardless of the color of emitted light. The white fluorescent bodies 121 also achieve significant increase in the brightness of the light-conducting plate 108. As a result, the esthetic look can be enhanced without increasing the production costs. Particularly since the light-emitting diodes 111 rarely experience a blown bulb and therefore require little replacement, the maintenance work of the manager can be reduced.

The above explained a preferred embodiment of the present invention. However, the present invention is not limited to this embodiment alone. Instead, as explained below its design can be improved or modified in various ways as long as such improvement or modification does not deviate from the key points of the present invention.

For example, the above embodiment illustrates a case where the light-emitting unit 101 is installed on a horizontal surface, namely floor U. However, the light-emitting unit 101 can also be positioned vertically in such a way that the transparent glass plate 106 faces the front. In other words, the light-emitting unit 101 can be installed in a window or on a wall of a building to provide lighting effect for the window or wall. In this application, there is no worry about people slipping over the unit and therefore projections 119 are no longer necessary.

In the above embodiment, multiple light-emitting units 101 are connected using base metals 103. However, it is also possible to provide concave/convex shapes on the side face of the casing 104 of the light-emitting unit 101 for fitting with other adjacent light-emitting unit 101 in such a way that the concave section on the casing 104 of one unit is fitted with the convex section on the casing 104 of the other unit to connect the two units. In addition, in the above embodiment space K is created between the casing 104 and floor U using a base metal 103 (i.e., connection fitting). However, another member (spacer, etc.) can be provided, instead of the connection fitting, to create space K for wiring.

Furthermore, in the above embodiment light is emitted from the entire surface of the transparent glass plate 106. However, it is also possible, for example, to provide a nameplate having holes shaped in letters, etc., below the transparent glass plate 106 in order to emit light only from the letters. Alternatively, the letters may be made opaque and the background surrounding the letters transparent. Either way, letters identifying the name of a venue or entrance/exit are made visually recognizable to allow for easy, smooth navigation of visitors, etc., in addition to providing artistic effects.

As explained above, the surface light-emitting unit has its light-emitting diodes installed on the side face of the light-conducting plate and thus allows for designing a very thin casing. As a result, if this unit is installed on a floor, for example, the projection above the floor can be kept relatively low. This removes restrictions on the installation location of the surface light-emitting unit and prevents difficulty associated with stepping up/down the unit, and consequently allows for realization of lighting effects in a desired location. In addition, major construction works to bury the unit into the floor, etc., are not required and multiple units can be combined to a desired size according to the floor area, etc. Therefore, a need to produce artistic or decorative effects using light only for a limited period during an event held in a store, etc., can be easily accommodated. Furthermore, the ability to change the color of light emitted from the surface member allows for color manipulation and further enhances the decorative effects using light.

The surface light-emitting unit utilizes the space between the casing and mounting surface to wire the power cable and power-distribution cable. This prevents the power-distribution cable, etc., from being exposed and greatly enhances the appearance as a result. In addition, since multiple surface light-emitting units can be connected in series using power-distribution cables, operating power can be supplied reliably to all surface light-emitting units regardless of the number of surface light-emitting units installed.

The surface light-emitting unit prevents the liquid flowing into the outer bottom face of the casing from flowing further toward the power terminal. Therefore, leak current, etc., can be reliably prevented and greater safety is assured.

The surface light-emitting unit allows for interlocking of the illumination conditions of individual surface light-emitting units regardless of the number of surface light-emitting units installed. As a result, the units can be controlled according to a specified pattern to greatly enhance the artistic effects using light.

The surface light-emitting unit enables light-emitting diodes of the same color to be arranged more closely to each other and therefore suppresses brightness variation and maintains an esthetic look even when the color of light emitted from the surface member is changed, for example.

The surface light-emitting unit uses a transparent glass plate to suppress clouding due to scratches and thereby maintains transparency over a long period of time. In addition, multiple projections prevent people walking on top from slipping and thereby assure safety.

As explained above, the present invention requires only one light-emitting unit to be connected directly to the commercial AC power outlet and dimming console, even when a lighting system is configured by multiple light-emitting units, which eliminates the need for a dimming panel required in conventional systems. This not only simplifies the overall structure but also facilitates the construction of a lighting system. In addition, the distance between adjacent light-emitting units is constant, and light-emitting units can be inter-connected using relatively short cables. This prevents the wiring from becoming complicated, and as a result light-emitting units can be inter-connected easily and in a more esthetically appealing manner.

The invention claimed is:

1. A surface light-emitting unit, comprising;
    a plate-shaped surface member that can transmit light,
    a light-conducting plate installed below said surface member,
    a light-emitting means having multiple light-emitting diodes of different emission colors and installed on the side face of said light-conducting plate,
    a light-diffusing/reflecting member installed below said light-conducting plate that diffuses and reflects the light transmitting through said light-conducting plate,
    an emission-color selection means for selecting said light-emitting diode to be illuminated or blinked among those provided by said light-emitting means,
    a roughly rectangular solid casing for providing said surface member at a top opening, said casing storing said light-conducting plate, light-emitting means and light-diffusing/reflecting member and being installed along a mounting surface including a floor or wall of a structure, and
    a connection part that can be connected to other surface light-emitting units installed adjacently,
    wherein said plate-shaped surface member is formed by a transparent glass plate with multiple projections formed on its surface at specified intervals.

2. The surface light-emitting unit described in claim 1, further comprising;
    a spacer between said casing and mounting surface that creates a space, and
    a power terminal installed on the outer bottom face of said casing that can connect a power cable for supplying operating power to said light-emitting means and a power-distribution cable for distributing the supplied operating power to other surface light-emitting units installed adjacently,
    wherein said space is set sufficiently wide for wiring at least said power cable and power-distribution cable.

3. The surface light-emitting unit described in claim 1; wherein said emission-color selection means has a microcomputer that sends and receives light-emission information to and from other surface light-emitting units, and wherein said microcomputer has:
    a judgment means for judging the master-slave relationship with respect to other surface light-emitting units, and
    a light-emission control means that transmits said light-emission information to other surface light-emitting units when said judgment means has judged that the own unit is the master, or receives said light-emission information sent from other surface light-emitting units when the aforementioned said judgment means has judged that the own unit is the slave, and then illuminates or blinks said light-emitting diodes based on said light-emission information.

4. The surface light-emitting unit described in claim 1; wherein said light-emitting means is formed by groups of light-emitting diodes each comprising three-color light-emitting diodes arranged in a triangular shape and said multiple light-emitting diode groups are arranged in a single line along said side face of said light-conducting plate.

5. The surface light-emitting unit described in claim 1; wherein said light-emitting means is formed by light-emitting diode arrays where said light-emitting diodes of three colors are arranged sequentially in a repeated pattern along said side face of said light-conducting plate in such a way that the adjacent light-emitting diodes have different colors, and wherein said multiple light-emitting diode arrays are stacked in the thickness direction of said light-conducting plate, and said light-emitting diode arrays are displaced in the vertical direction with respect to said stacking direction in such a way that said light-emitting diodes in the stacking direction do not overlap with one another and said light-emitting diodes in each diagonally facing pair have different colors.

6. The surface light-emitting unit described in claim 2, comprising;
    a cylindrical liquid-blocking member formed around said power terminal on the outer bottom face of said casing and used to block liquid, flowing along the outer bottom surface of said casing, from flowing down toward said power terminal.

7. The surface light-emitting unit described in claim 2; wherein said emission-color selection means has a microcomputer that sends and receives light-emission information to and from other surface light-emitting units, and wherein said microcomputer has:
    a judgment means for judging the master-slave relationship with respect to other surface light-emitting units, and
    a light-emission control means that transmits said light-emission information to other surface light-emitting units when said judgment means has judged that the own unit is the master, or receives said light-emission information sent from other surface light-emitting units when said judgment means has judged that the own unit is the slave, and then illuminates or blinks said light-emitting diodes based on said light-emission information.

8. The surface light-emitting unit described in claim 2; wherein said light-emitting means is formed by groups of light-emitting diodes each comprising three-color light-emitting diodes arranged in a triangular shape and said multiple light-emitting diode groups are arranged in a single line along said side face of said light-conducting plate.

9. The surface light-emitting unit described in claim 2; wherein said light-emitting means is formed by light-emitting diode arrays where said light-emitting diodes of three colors are arranged sequentially in a repeated pattern along said side face of the aforementioned said light-conducting plate in such a way that the adjacent light-emitting diodes have different colors, and wherein said multiple light-emitting diode arrays are stacked in the thickness direction of said light-conducting plate, and said light-emitting diode arrays are displaced in the vertical direction with respect to said stacking direction in such a way that said light-emitting diodes in the stacking direction do not overlap with one another and said light-emitting diodes in each diagonally facing pair have different colors.

10. The surface light-emitting unit described in claim 3; wherein said light-emitting means is formed by groups of light-emitting diodes each comprising three-color light-emitting diodes arranged in a triangular shape and said multiple light-emitting diode groups are arranged in a single line along said side face of said light-conducting plate.

11. The surface light-emitting unit described in claim 3; wherein said light-emitting means is formed by light-emitting diode arrays where said light-emitting diodes of three colors are arranged sequentially in a repeated pattern along said side face of said light-conducting plate in such a way that the adjacent light-emitting diodes have different colors, and wherein said multiple light-emitting diode arrays are stacked in the thickness direction of said light-conducting plate, and said light-emitting diode arrays are displaced in the vertical direction with respect to said stacking direction in such a way that said light-emitting diodes in the stacking direction do not overlap with one another and said light-emitting diodes in each diagonally facing pair have different colors.

12. A light-emitting unit comprising;
a plate-shaped surface member that can transmit light,
a light-conducting plate installed below said surface member,
a light-emitting means having multiple light-emitting diodes of different emission colors and installed on the side face of said light-conducting plate,
a light-diffusing/reflecting member installed below said light-conducting plate that diffuses and reflects the light transmitting through said light-conducting plate,
a power terminal that can connect a power cable for supplying commercial AC power and a power-transmission cable for transmitting the supplied commercial AC power to other light-emitting units installed adjacently,
a signal terminal that can connect a reception cable for receiving DMX signal from a dimming console and a transmission cable for transmitting the received DMX signal to other light-emitting units installed adjacently,
an AC/DC converter for converting said commercial AC power supplied via said power cable into the operating power for the aforementioned said light-emitting means,
an emission-color selection means for selecting said light-emitting diode to be illuminated or blinked among those provided by said light-emitting means, based on said DMX signal received via said reception cable,
a roughly rectangular solid casing for providing said surface member at a top opening, said casing storing said light-conducting plate, light-emitting means, light-diffusing/reflecting member, AC/DC converter and emission-color selection means and being installed along a mounting surface including a floor or wall of a structure, and
a connection part that can be connected to other light-emitting units installed adjacently,
wherein said plate-shaped surface member is formed by a transparent glass plate with multiple projections formed on its surface at specified intervals.

13. The light-emitting unit as described in claim 12 further comprising;
a spacer between said casing and mounting surface that creates a sufficient space for wiring said power cable, power-transmission cable, reception cable and transmission cable,
wherein said power terminal and signal terminal are provided on the rear face of said casing opposing said mounting surface.

* * * * *